United States Patent
Shah et al.

(10) Patent No.: US 12,333,351 B2
(45) Date of Patent: Jun. 17, 2025

(54) SYNCHRONIZATION OF PROCESSING ELEMENTS THAT EXECUTE STATICALLY SCHEDULED INSTRUCTIONS IN A MACHINE LEARNING ACCELERATOR

(71) Applicant: SiMa Technologies, Inc., San Jose, CA (US)

(72) Inventors: Nishit Shah, Sunnyvale, CA (US); Srivathsa Dhruvanarayan, Saratoga, CA (US); Reed Kotler, San Jose, CA (US)

(73) Assignee: SiMa Technologies, Inc., San Jose, CA (US)

( * ) Notice: Subject to any disclaimer, the term of this patent is extended or adjusted under 35 U.S.C. 154(b) by 1266 days.

(21) Appl. No.: 16/852,338

(22) Filed: Apr. 17, 2020

(65) Prior Publication Data
US 2021/0326189 A1    Oct. 21, 2021

(51) Int. Cl.
G06F 9/52 (2006.01)
G06F 17/16 (2006.01)
G06N 3/04 (2023.01)
G06N 3/10 (2006.01)

(52) U.S. Cl.
CPC ............... *G06F 9/52* (2013.01); *G06F 17/16* (2013.01); *G06N 3/04* (2013.01); *G06N 3/10* (2013.01)

(58) Field of Classification Search
CPC .......... G06F 9/52; G06F 17/16; G06F 9/3836; G06F 9/3877; G06N 3/04; G06N 3/10; G06N 3/082; G06N 3/063
See application file for complete search history.

(56) References Cited

U.S. PATENT DOCUMENTS

| | | |
|---|---|---|
| 7,774,531 B1 | 8/2010 | Karlsson |
| 7,774,552 B1 | 8/2010 | Cypher et al. |
| 9,928,460 B1 | 3/2018 | Nowatzyk et al. |
| 10,810,784 B1 | 10/2020 | Rai et al. |
| 2003/0141434 A1 | 7/2003 | Ishikawa et al. |
| 2004/0088488 A1 | 5/2004 | Ober et al. |
| 2004/0103251 A1 | 5/2004 | Alsup |
| 2005/0086451 A1 | 4/2005 | Yates, Jr. et al. |
| 2011/0199391 A1 | 8/2011 | Olsson et al. |
| 2012/0084238 A1 | 4/2012 | Kristal et al. |

(Continued)

OTHER PUBLICATIONS

Matejka et al. "Combining PREM compilation and static scheduling for high-performance and predictable MPSoC execution" Parallel Computing, vol. 85, Jul. 2019, pp. 27-44, ISSN 0167-8191, https://doi.org/10.1016/j.parco.2018.11.002. (Year: 2019).*

(Continued)

*Primary Examiner* — James D. Rutten
(74) *Attorney, Agent, or Firm* — Fenwick & West LLP

(57) ABSTRACT

A method, system, and apparatus are disclosed herein for bridging a deterministic phase of instructions with a non-deterministic phase of instructions when those instructions are executed by a machine learning accelerator while executing a machine learning network. In the non-deterministic phase, data and instructions are transferred from off-chip memory to on-chip memory. When the transfer is complete, processing elements are synchronized and, upon synchronization, a deterministic phase of instructions is executed by the processing elements.

21 Claims, 13 Drawing Sheets

(56) References Cited

U.S. PATENT DOCUMENTS

| | | | |
|---|---|---|---|
| 2014/0129806 A1* | 5/2014 | Kaplan | G06F 9/3836 |
| | | | 712/E9.016 |
| 2014/0164748 A1 | 6/2014 | Dundas | |
| 2014/0173216 A1 | 6/2014 | Jayasena et al. | |
| 2015/0220347 A1* | 8/2015 | Glossner | G06F 9/3853 |
| | | | 712/215 |
| 2017/0083431 A1* | 3/2017 | Burger | G06F 9/3828 |
| 2017/0293510 A1* | 10/2017 | Memon | G06F 11/3433 |
| 2019/0004878 A1 | 1/2019 | Adler et al. | |
| 2019/0018815 A1 | 1/2019 | Fleming et al. | |
| 2019/0042920 A1 | 2/2019 | Akin et al. | |
| 2019/0076031 A1 | 3/2019 | Valys et al. | |
| 2019/0155768 A1 | 5/2019 | Wilkinson et al. | |
| 2019/0273662 A1 | 9/2019 | Mwanje et al. | |
| 2019/0286973 A1 | 9/2019 | Kovvuri et al. | |
| 2019/0303346 A1 | 10/2019 | Brewer | |
| 2019/0325303 A1 | 10/2019 | Daga et al. | |
| 2019/0391796 A1 | 12/2019 | Brady et al. | |
| 2020/0007342 A1 | 1/2020 | Liem et al. | |
| 2020/0012536 A1 | 1/2020 | Lacey et al. | |
| 2020/0012537 A1 | 1/2020 | Lacey et al. | |
| 2020/0073830 A1 | 3/2020 | Verrilli et al. | |
| 2020/0090383 A1 | 3/2020 | Dwivedi | |
| 2020/0117465 A1* | 4/2020 | Cassidy | G06F 9/30036 |
| 2020/0133914 A1 | 4/2020 | Wilkinson et al. | |
| 2020/0150713 A1 | 5/2020 | Knowles et al. | |
| 2021/0124626 A1 | 4/2021 | Manula | |
| 2021/0201526 A1 | 7/2021 | Moloney et al. | |
| 2021/0216464 A1 | 7/2021 | Uhrenholt et al. | |

OTHER PUBLICATIONS

Andri et al., "YodaNN: An Architecture for Ultralow Power Binary-Weight CNN Acceleration", IEEE Transactions on Computer-Aided Design of Integrated Circuits and Systems, vol. 37, No. 1, Jan. 2018, pp. 48-60.

Ankit et al., "PUMA: A Programmable Ultra-efficient Memristor-based Accelerator for Machine Learning Inference", ASPLOS'19, Apr. 13-17, 2019, Providence, RI, USA, pp. 715-731.

Chen et al. "DianNao: A Small-Footprint High-Throughput Accelerator for Ubiquitous Machine-Learning;" ACM SIGARCH Computer Architecture News, vol. 42, Issue 1, pp. 269-284, Mar. 5, 2014 (Mar. 5, 2014) Retrieved on Jul. 25, 2021 (Jul. 25, 2021) from <https://dl.acm.org/doi/abs/10.1145/2654822.2541967>.

Du et al., "ShiDianNao: Shifting Vision Processing Closer to the Sensor", ISCA'15, Jun. 13-17, 2015, Portland, OR, USA, pp. 92-104.

Everson et al., "A 104.8TOPS/W One-Shot Time-Based Neuromorphic Chip Employing Dynamic Threshold Error Correction in 65nm", IEEE Asian Solid-State Circuits Conference Nov. 5-7, 2018/Tainan, Taiwan, pp. 273-276.

Guha, A. et al., "Deepframe: A Profile-Driven Compiler for Spatial Hardware Accelerators," 2019 28th International Conference on Parallel Architectures and Compilation Techniques (PACT), Sep. 23-26, 2019, pp. 68-81.

International Search Report and Written Opinion, Patent Cooperation Treaty Application No. PCT/US2021/025001, Jun. 10, 2021, 14 pages.

International Search Report and Written Opinion, Patent Cooperation Treaty Application No. PCT/US2021/027787, Aug. 25, 2021, 18 pages.

Jiao et al., "A 12nm Programmable Convolution-Efficient Neural-Processing-Unit Chip Achieving 825TOPS", ISSCC 2020, Session 7, Feb. 18, 2020, 5 pages.

Reuther et al., "Survey and Benchmarking of Machine Learning Accelerators", 2019 IEEE High Performance Extreme Computing Conference (HPEC) Sep. 24-26, 2019, pp. 1-9.

Shawahna et al., "FPGA-Based Accelerators of Deep Learning Networks for Learning and Classification: A Review", IEEE Access, vol. 7, 2019, pp. 7823-7858.

United States Office Action, U.S. Appl. No. 16/852,326, Jul. 5, 2022, 22 pages.

United States Office Action, U.S. Appl. No. 16/852,326, Jan. 23, 2023, 28 pages.

Extended European Search Report, European Patent Office Application No. 21782147.9, dated Feb. 29, 2024, 11 pages.

United States Office Action, U.S. Appl. No. 16/852,326, Jun. 27, 2023, 32 pages.

* cited by examiner

SYNCHRONIZATION OF PROCESSING ELEMENTS THAT EXECUTE STATICALLY SCHEDULED INSTRUCTIONS IN A MACHINE LEARNING ACCELERATOR

BACKGROUND

Technical Field

This disclosure relates generally to the implementation of machine learning networks on hardware, and more particularly to the synchronization of processing elements for the execution of statically scheduled instructions.

Description of Related Art

Machine learning is one of the most powerful recent trends in technology. In machine learning, a model is developed to perform a certain task. The model, which will be referred to as a machine learning network, is trained and deployed in order to carry out that task. For example, a model may be developed to recognize the presence of objects within images captured by a set of cameras. Once the model is deployed, images captured by the cameras are input to the machine learning network, which then outputs whether (or to what confidence level) objects are present within the images.

Machine learning networks typically require the handling of a large volume of data and the execution of a large number of computations. As a result, they are commonly implemented in compute facilities with access to significant resources, such as in the cloud or on server clusters. However, the sources of input to machine learning networks may be located remotely from these compute facilities. For example, cameras and other types of sensors may be located on the edge of the network. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time. In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. Thus, one common paradigm is for the input sources to be web-based so that they can continuously send their captured data to the cloud-based compute facility, which then executes the machine learning network and returns the result.

There can be many advantages if the machine learning network was instead embedded on edge devices, such as combined with the camera system. However, many types of edge devices (e.g., cameras) have resource limitations (e.g., limited memory, power consumption, etc.). As a result, processing elements may be simplified to conserve resources, but this may give rise to a need to synchronize processing elements in their execution.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

Figure (FIG. 1A illustrates bridging execution of a non-deterministic phase of instructions and a deterministic phase of instructions.

DETAILED DESCRIPTION OF THE PREFERRED EMBODIMENTS

Figure 1A:
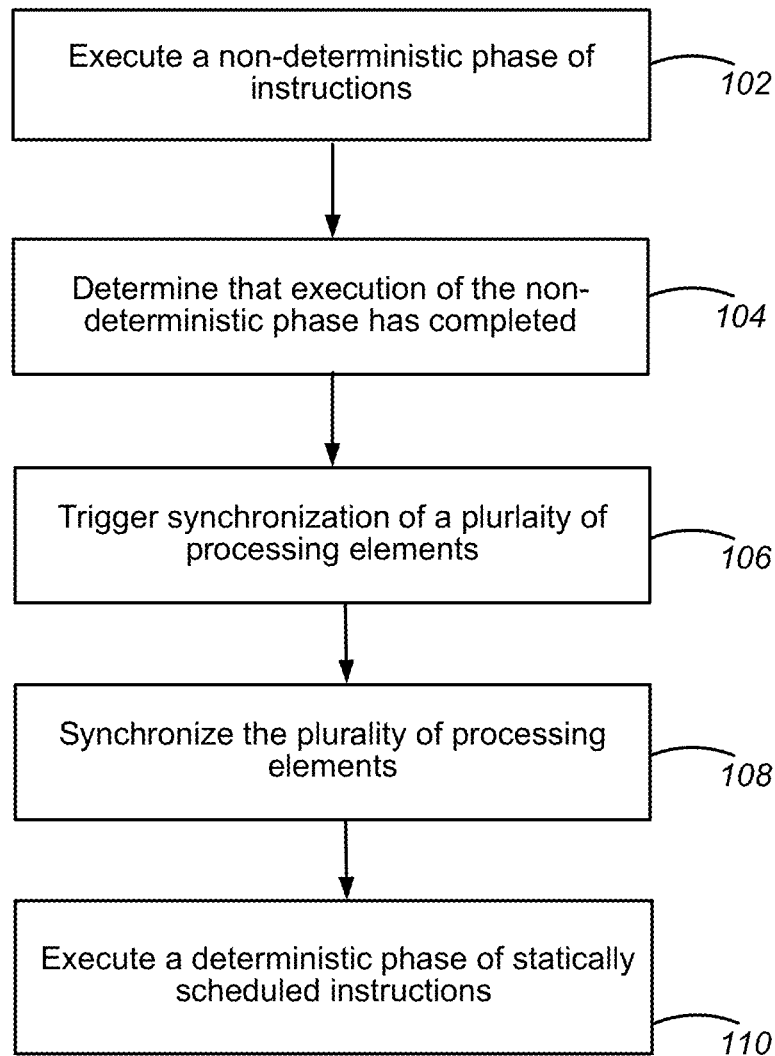
FIG. 1B is a block diagram of a system with a machine learning accelerator (MLA) and corresponding compiler.
FIG. 1C illustrates actions that the MLA may perform during a non-deterministic phase of instructions.
FIG. 1D illustrates actions that the MLA may perform during a deterministic phase of instructions.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A Machine Learning Accelerator (MLA) is described herein that may be built into an edge device. The MLA executes a machine learning network (MLN). As will be described in more detail below, one method of optimizing execution of an MLN is to use a compiler that, prior to run-time, generates a computer program with statically scheduled instructions for executing the MLN. For example, the compiler may determine which instructions are executed by which processing elements in the MLA at what time. Static scheduling enables one or more processing elements in the MLA to execute the instructions with no run-time conditions, branching or dependencies. This may result in lower power consumption, simpler MLA design, and lower cost.

However, because on-chip memory accessible by the processing elements (which may be referred to as local memory) is limited, the statically scheduled instructions and corresponding data may be stored in off-chip memory and then transferred to the on-chip memory for execution by the processing elements. On-chip memory such as SRAM has a known access time, so data transfers from SRAM may be statically scheduled. However, SRAM typically has limited space. Off-chip memory such as DRAM has much more space available, but it has variable access time, so the compiler is not able to predict when the instructions (or corresponding data) fetched from the off-chip memory are ready for execution and then cannot statically schedule data transfers from DRAM. This issue may be compounded if instructions are to be executed by multiple processing elements according to a common static schedule because the processing elements must be synchronized in their operation. One processing element cannot start execution of its statically scheduled instructions later than another processing element, just because its instructions or data arrived later.

In one approach, to facilitate execution, the compiler may group statically scheduled instructions into phases referred to as deterministic phases. All the instructions in the deterministic phase are statically scheduled (i.e., have deterministic timing) with respect to each other. Each deterministic phase of instructions may be preceded by a corresponding non-deterministic phase. The non-deterministic phase includes instructions for fetching the statically scheduled instructions from the off-chip memory to instruction queues for the processing elements, and instructions for transferring the corresponding data from the off-chip memory to the on-chip memory. Because the compiler may not be able to predict when the non-deterministic phase is completed, it is advantageous to efficiently bridge execution of the non-deterministic phase of instructions and the deterministic phase of instructions.

FIG. 1A illustrates bridging execution of a non-deterministic phase of instructions and a deterministic phase of instructions. Although the actions of FIG. 1A are shown as following one another, in some embodiments, one or more of actions of FIG. 1A may be performed in parallel. For example, actions 102 and 104 may be executed in parallel with action 110. At 102, an MLA executes a non-deterministic phase of instructions. Those instructions may include instructions to retrieve, from the off-chip memory, both data and statically scheduled instructions. Retrieving both data and statically scheduled instructions from off-chip memory is discussed in more detail later in this disclosure.

At 104, the MLA determines that execution of the non-deterministic phase of instructions has been completed. The MLA may determine that all instructions to transfer data from the off-chip memory and instructions to fetch statically scheduled instructions from the off-chip memory have been executed, for the current non-deterministic phase. In other words, the non-deterministic phase includes (a) transferring data to be used in the deterministic phase, to memory accessible by the processing elements during the deterministic phase, and (b) transferring instructions to be executed by the processing elements during the deterministic phase to instruction queues for the processing elements. Thus, execution of the deterministic phase is dependent on completion of (a) and (b) above. In some embodiments, the MLA transfers the data prior to transferring the statically scheduled instructions that use the data and therefore only need check that (b) is completed because that implies that (a) was also completed.

The data to be used in the deterministic phase may include parameters for the MLN, such as weights in the MLN. As the MLN is executed by the MLA, various prior deterministic phases may output intermediate values. The MLA may write those intermediate values into off-chip memory and when those intermediate values are to be used, the MLA may retrieve those values during the non-deterministic phase to be used during the deterministic phase.

At 106, the MLA triggers synchronization of a plurality of processing elements. For example, the MLA may use a flag in a register, an interrupt, or another suitable method to trigger synchronization. Thus, synchronization may be triggered based on all statically scheduled instructions being transferred into the corresponding processing elements. At 108, the MLA synchronizes the processing elements. The synchronization process may include each processing element generating and transmitting a ready signal that indicates that the processing element is ready for execution of the deterministic phase of instructions. Each ready signal may be received at a centralized location (e.g., at a predetermined processing element). When all the signals are received at the centralized location, the centralized location may transmit an acknowledgment signal indicating to each processing element that the deterministic phase is ready for execution.

In some embodiments, the Tiles may be synchronized in a different way. For example, a microcontroller sets a value of a predetermined location in memory to a number of Tiles to be synchronized. Each Tile signals that it is ready to receive data and begins to poll a flag that can be referred to as a resume flag. Each Tile signaling that it is ready to execute instructions causes the value in the predetermined location to be decremented, thus indicating the number of Tiles left to be synchronized. When the number of Tiles to be synchronized reaches zero (i.e., the value becomes zero), the resume flag is set to True. This process may be implemented in circuitry in combination with the microcontroller to initialize the circuitry.

At 108, the processing elements execute the deterministic phase of instructions. For example, each processing element may execute the set of statically scheduled instructions that was loaded during the non-deterministic phase. The execution may include performing mathematical operations on the data retrieved from the off-chip memory during the non-deterministic phase. Prior to executing the statically scheduled instructions, the MLA (e.g., during the non-deterministic phase), may determine whether the data to be used during the next deterministic phase has been transferred to memory accessible by that processing element. In some embodiments, the transfer of data may be followed by transfer of instructions, as discussed above. In addition, each processing element may wait for a specific number of instructions to be transferred into the element's instruction queues before starting execution.

The deterministic phase has a known duration of execution as the compiler is able to statically schedule all the instructions in the deterministic phase. For example, based on the number and type of instructions and the static scheduling, the compiler may determine when the deterministic phase ends. Thus, in some embodiments, the MLA may start execution of a subsequent non-deterministic phase of the instructions based on the known duration of the deterministic phase. In some embodiments, the next non-deterministic phase may start prior to a previous deterministic phase ending, so that non-deterministic and deterministic phases are executing concurrently. Furthermore, the static schedule for executing the instructions in the deterministic phase is based on the known duration for executing each instruction and on a known topology of data transfer paths to and from the processing elements. Thus, execution of the instructions according to the static schedule avoids collisions or the need for arbitrations along the data transfer paths.

Figure 1B:
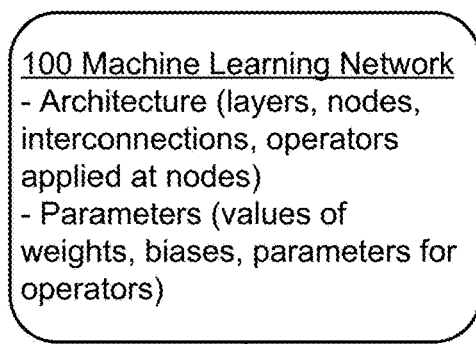
Figure 1B:
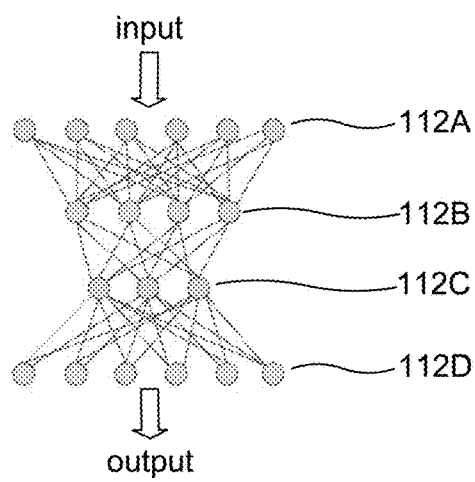
Figure 1B:
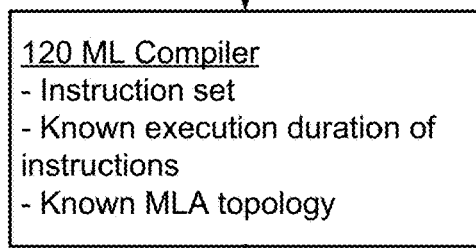
Figure 1B:
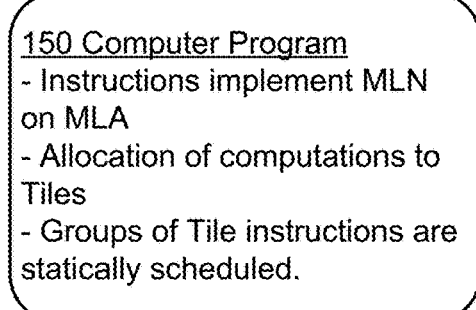
Figure 1B:
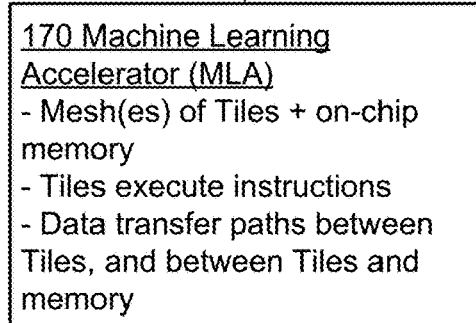
Figure 1B:
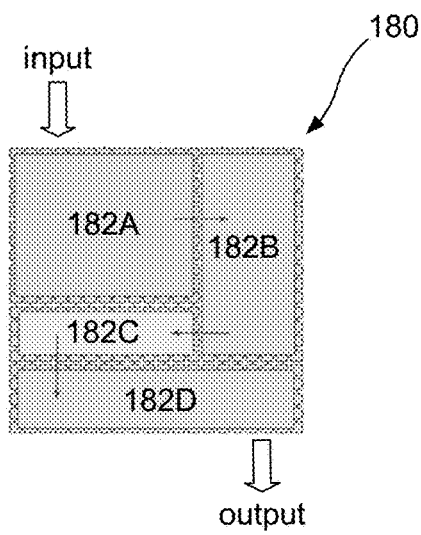
Figure 1B:
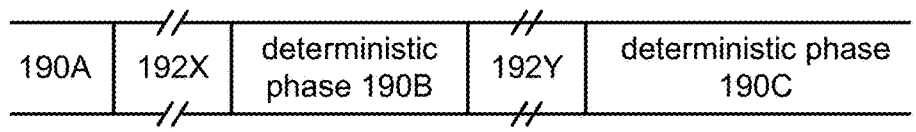

As discussed above, an MLA may be part of an edge device. The MLA may be executing both non-deterministic and deterministic phases of instructions. FIG. 1B is a block diagram of one example of a system with a machine learning accelerator (MLA) 170 and corresponding compiler 120, according to the invention. The compiler 120 receives a description of a machine learning network 100 and generates a computer program 150 that implements the machine learning network using MLA 170. The computer program 150 includes instructions that are executed by processing elements (Tiles) in the MLA according to a schedule determined by the compiler. For convenience, these will be refereed to as statically scheduled instructions. The instructions executed by the Tiles (Tile instructions) are statically scheduled because the compiler can determine which instructions are executed by which Tiles at what times, as will be explained in greater detail below. For example, for the statically scheduled instructions, there are no conditions, branching or data dependencies that can be resolved only at run-time, and which would affect the timing and order of the execution of the instructions. Note that the static schedule determined by the compiler may or may not be included as part of the instructions and computer program. In some embodiments, the computer program may expressly include the schedule, specifying that instruction A is executed at cycle X, instruction B is executed at cycle X+4, instruction C is executed at cycle X+12, etc. In alternate embodiments, the computer program may specify only that instruction A is executed, followed by instruction B, and then instruction C, but without any scheduling information. Even though the static schedule is not expressly specified, these instructions will still execute according to the schedule determined by the compiler because the compiler knows how long it takes to execute each instruction. As a result of the static scheduling, the MLA and instruction set for the MLA may be simplified, with the complexity offloaded to the compiler. A simpler MLA can result in lower cost, lower power consumption and higher performance, all of which are desirable for implementation in edge devices.

In more detail, the MLN 100 may be described by an architecture and parameters. A depiction of an MLN is shown to the right of box 100 in FIG. 1B. Most MLNs include multiple layers 112, each with one or more nodes which are represented by circles in FIG. 1B. The lines between nodes in FIG. 1B represent interconnections between the nodes (and layers). Each node calculates a weighted sum of the values received from its connected nodes, possibly also applying a bias. Examples are matrix multiplication and convolution. Each node may also apply certain functionality (operators), such as nonlinear functions (e.g., tanh function), softmax operator, etc. A typical node may compute an output:

$$y=F(\Sigma w_i x_i + b) \quad (1)$$

where $x_i$ are the inputs received from other nodes i, $w_i$ are weights, b is a bias and F( ) is a nonlinear operator. The MLN architecture includes the number of nodes (and layers) and their interconnectivity, and the operators applied at nodes. The operators may be described in a parameterized form. The MLN parameters include the weights, biases, and parameters for the operators.

MLNs may vary in size, depending on the desired task. Small MLNs may have 5-10 or fewer layers, medium size MLNs may have 30-50 layers, and large MLNs may have 100 or more layers. Examples of inputs include text, images and video. Some of the layers may be fully interconnected (i.e., every node in one layer provides input to every node in the next layer), and others may be more locally interconnected (e.g., to implement convolutions). Each weighted interconnect represents a scalar multiplication. The total number of scalar multiplications required to implement an MLN may be on the order of millions, billions, tens of billions or even more. These may be carried out by matrix multiplications.

The MLA 170 includes a plurality of Tiles 180 and an on-chip memory system implemented on a semiconductor die. The Tiles are organized into one or more meshes of interconnected Tiles. A depiction of a Tile mesh is shown to the right of box 170 in FIG. 1B. In each mesh, the Tiles 180 are organized in a regular pattern and the interconnections within each mesh provide data transfer paths between Tiles in the mesh. The Tiles execute computations according to instructions received by the Tiles and using data stored in the on-chip memory system. These instructions may be for computations and/or for data transfer. Computations include multiply (including matrix multiply), add, and operators (e.g., nonlinear functions, lookup table, min/max, pooling). These are computations that implement the MLN. In the example of FIG. 1B, the computations performed by layers 112A-D are allocated to groups 182A-D of Tiles as indicated. The allocation is not required to be 1:1. For example, multiple layers could be allocated to a single Tile or vice versa. Not every computation required to implement an MLN need be executed by a Tile; some computation may be executed outside the MLA (e.g., floating point operations, if the Tiles only do integer arithmetic). Tiles typically will at least perform matrix multiplication.

The compiler 120 receives a description of the MLN 100 and generates a computer program 150 that implements the MLN using the MLA 170. The computer program 150 receives an input sample for the MLN and executes the operations of the MLN to produce the output for the MLN. The computer program 150 includes instructions to be executed by the Tiles for implementing computations in the MLN and may also include instructions to be executed by other elements, such as a controller outside the Tiles. For additional examples and description of the MLA and related components, see U.S. application Ser. No. 16/840,216, "Machine Learning Network Implemented by Statically Scheduled Instructions, with Compiler," which is incorporated by reference herein in its entirety.

As shown in FIG. 1B, the compiler partitions the Tile instructions into one or more deterministic phases 190 which typically utilize multiple Tiles. The instructions in a deterministic phase 190 may be statically scheduled by the compiler. For example, a deterministic phase 190 may include a series of computations required to implement a portion of the MLN, where the time required for each computation and associated data transfers is known. As a result, the compiler may statically schedule the Tile instructions within that deterministic phase relative to the other Tile instructions in the phase. The resulting computer program produced by the compiler then implements an allocation of instructions to Tiles and a schedule for executing the instructions as determined by the compiler, although these may not be expressly contained with the computer program. In the example of FIG. 1B, the computations performed by layers 112A-D are allocated to groups 182A-D of Tiles as indicated. In addition, all the Tile instructions (including both for computation and for data transfer) are executed in a single deterministic phase.

The computer program may also include non-deterministic phases 192. For example, non-deterministic phases 192 may include data fetch or instruction fetch from off-chip memory where the time required to execute the operation varies too much to allow reliable synchronization with other operations. Other examples include computations that occur off-chip, and conditions, branching and other programmatic constructs that depend on values not known until run-time. The breaks in the rectangles for the non-deterministic phases 192 indicate that the timing is not deterministic, whereas the deterministic phases 190 are represented by rectangles without breaks. In FIG. 1B, the deterministic and non-deterministic phases are shown as alternating. This is not required. For example, deterministic and non-deterministic phases may execute concurrently.

Figure 1C:
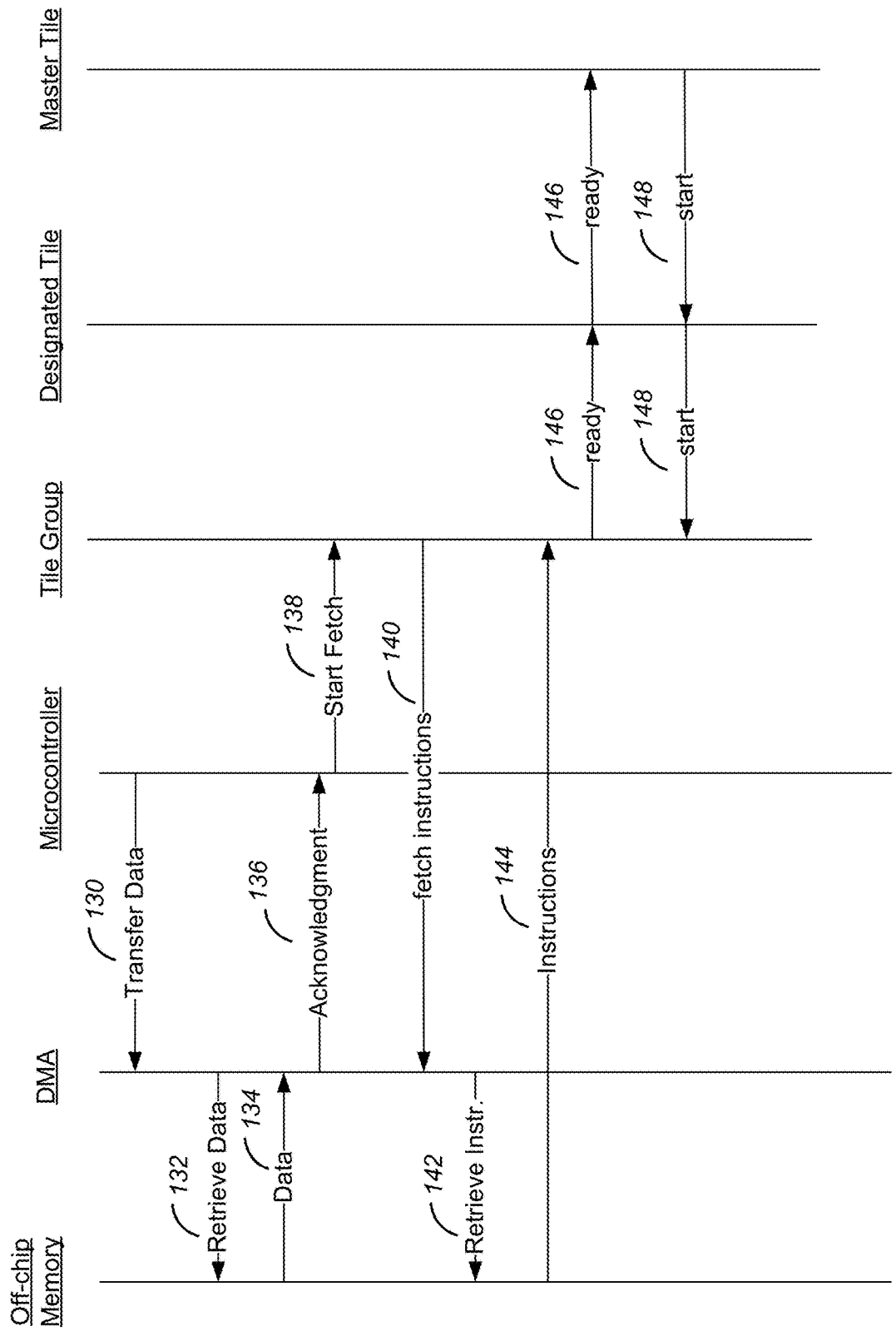

FIG. 1C illustrates actions that the MLA may perform during a non-deterministic phase. To demonstrate the actions of a non-deterministic phase, FIG. 1C shows a Direct Memory Access controller (DMA), a microcontroller, a Tile Group, a Designated Tile and a Master Tile. It should be noted that not all components shown in FIG. 1C are necessary. For example, the actions of FIG. 1C may be performed without a microcontroller.

The microcontroller may generate and transmit a command 130 to the DMA to transfer data from the off-chip memory (e.g., L3 memory) to the on-chip memory (e.g., L2 memory). The DMA generates and transmits a command 132 to the off-chip memory to retrieve the data and receives the data transfer 134 from the off-chip memory. In response, the DMA transmits an acknowledgment 136 to the microcontroller that the data has been transferred.

In some embodiments, the compiler adds one or more commands to a computer program (e.g., computer program 150) to retrieve data from the off-chip memory. The microcontroller may send one or more commands to the DMA. The DMA may access the off-chip memory and retrieve the data from addresses in the off-chip memory. The data is then written to the on-chip memory. In some embodiments, the on-chip memory may be divided into two levels: level 1 (L1) memory and level 2 (L2) memory.

The microcontroller may be an ARM M4 processor that orchestrates the off-chip memory accesses (e.g., transmits commands to the DMA for off-chip memory access). This microcontroller may have an MLC (ML Compiler) thread running on it and the compiled code that is responsible for initiating the data transfer from off-chip memory (e.g., DRAM) and subsequent notification to the respective Tiles. The compiled MLC thread is responsible for retrieving and posting data to external memory as well as any interactions with external interfaces. The microcontroller may communicate with the rest of MLA using one or more interfaces. The microcontroller may also generate the first "kickstart" instruction (a "Fetch Instructions" instruction) to each of the Tiles that consumes the data that has been written into on-chip memory. In addition, the microcontroller may include a core for executing instructions which in turn may include a floating-point unit The microcontroller may be external to the processing elements (e.g., Tiles) and may communicate with those processing elements (e.g., via an interface). In some embodiments, the microcontroller may execute the instructions to transfer data to be used in the deterministic phase, to memory accessible by the processing elements (e.g., on-chip memory) during the deterministic phase. For example, the microcontroller may determine, for each processing element, when the data for each processing element has been transferred to the memory accessible by a corresponding processing element, and upon that determination, the microcontroller may issue a command to each processing element to fetch instructions to be executed by that processing element.

Referring back to FIG. 1C, the microcontroller transmits one or more commands 138 to a plurality of processing elements (e.g., Tiles in the Tile Group) to fetch statically scheduled instructions from the off-chip memory (e.g., from dynamic random-access memory (DRAM)). For example, the microcontroller may write a corresponding fetch instruction into a designated register associated with each Tile. Each fetch instruction may include a corresponding address in the off-chip memory (e.g., DRAM) for starting to fetch the statically scheduled instructions. Each Tile reads the fetch instruction from the Tile's corresponding register and transmits one or more fetch commands 140 to the DMA. The DMA may receive the fetch instructions and, transmit a fetch command 142 to retrieve the instructions from the off-chip memory. The DMA receives instructions 144 from the off-chip memory. In some embodiments, the transfer may be performed in bulk (e.g., the DMA may request statically scheduled instructions for multiple Tiles. The DMA may resolve contention by employing one or more various algorithms (e.g., round robin). The DMA transmits corresponding instructions to each Tile (e.g., each Tile in the Tile group).

When each Tile receives the statically scheduled instructions for the Tile, each Tile may send a ready signal 146 to a designated Tile indicating that the statically scheduled instructions have been transferred to its instruction queue and the Tile is ready to execute those instructions. Thus, determining that execution of the non-deterministic phase has completed includes determining that all processing elements have generated ready signals. In some embodiments, the processing elements may be a part of a mesh of processing elements (e.g., mesh of tiles 280) and determining that all processing elements have generated ready signals is performed at least in part by circuitry within the mesh. A more detailed description of generating and processing ready signals is discussed later in this disclosure in relation to FIGS. 4 and 6.

When the Designated Tile receives all the ready signals 146 from all Tiles in the Tile Group, The Designated Tile transmits the ready signal 146 to the Master Tile. In some embodiments, there are multiple groups of Tiles that will be participating in the deterministic phase. Therefore, each Tile Group transmits a ready signal to a corresponding Designated Tile and each Designated Tile transmits the ready signal to the Master Tile. When the Master Tile receives all ready signals 146, the Master Tile transmits start signals 148 to each Designated Tile. Each Designated Tile transmits starts signal 148 to each Tile within the group to start execution of the deterministic state.

Figure 1D:
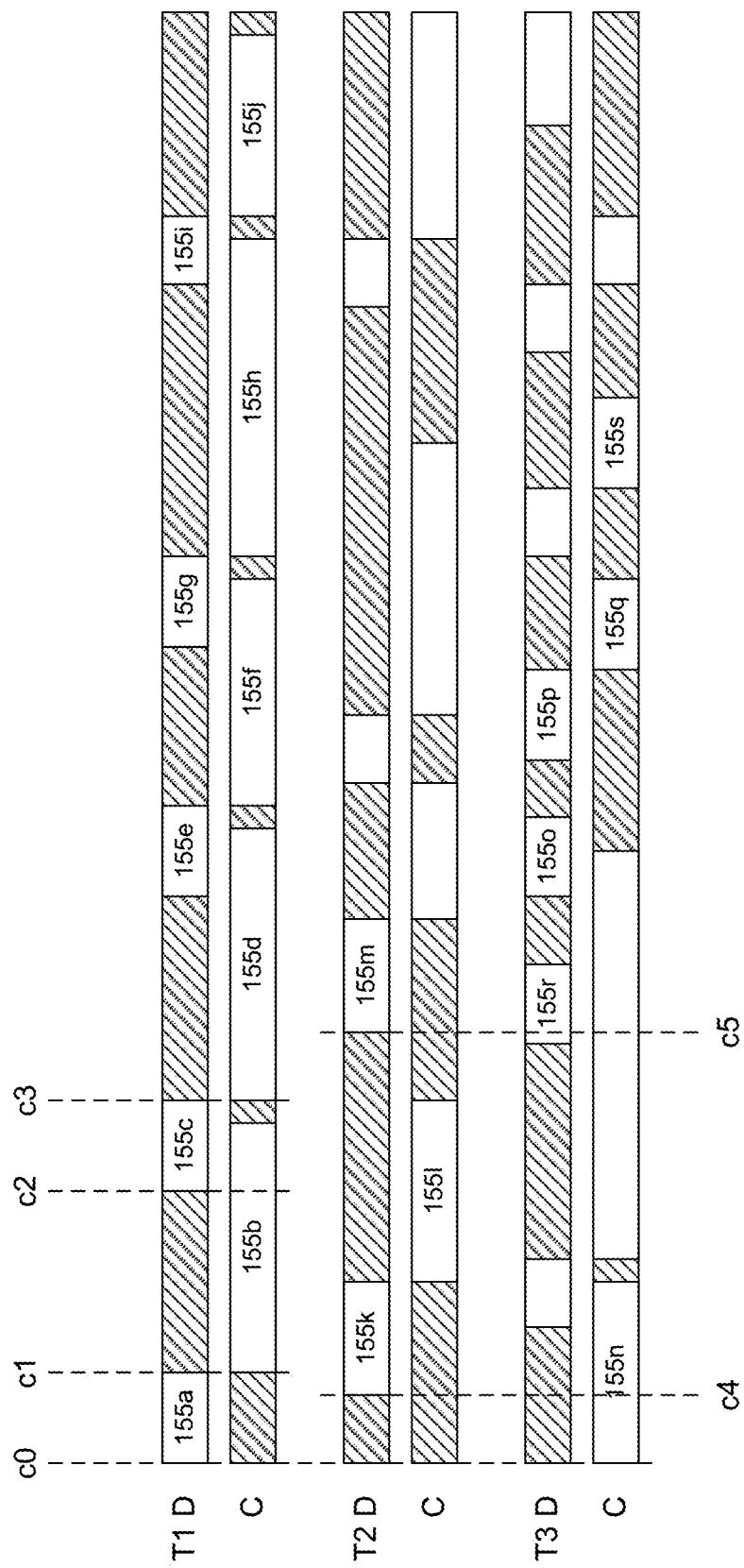

When the non-deterministic phase is completed and the Tiles are ready to execute instructions, the deterministic phase may begin. FIG. 1D illustrates actions that the MLA may perform during a deterministic phase. In this example, the instructions are executed by three Tiles, as denoted by T1, T2 and T3. Each Tile has two pipelines: a "D" pipeline for executing data transfer instructions and a "C" pipeline for executing compute instructions. The row labeled T1 D shows instructions executed by the Tile 1 D (data transfer) pipeline, and the row labeled T1 C shows instructions executed by the Tile 1 C (compute) pipeline. For this example, assume that all the data transfer instructions are instructions that load new data into that Tile for consumption by the compute pipeline. The white regions of each row denote the execution of instructions and the hashed regions indicate that the pipeline is idling or executing a NO-OP (no operation).

For Tile 1, instruction 155$a$ transfers data into Tile 1 and instruction 155$b$ then performs a computation that consumes that data. Instruction 155$b$ is dependent on instruction 155$a$. Here, the T1 C pipeline is not required to continuously poll the T1 D pipeline at run-time for when the data is available, and run-time message passing between the pipelines is not required to indicate that the data is available. Rather, because the duration (i.e., time required to execute) of instruction 155$a$ is known, the compiler knows when the data will be available (for convenience, marked as cycle c1 in the figure) and can construct a static schedule in which instruction 155b starts execution then. The duration of instruction 155b is also known, so the compiler knows that compute instruction 155d may start after instruction 155b. In this case, the compiler determines a static schedule in which instruction 155d starts at cycle c3. Compute instruction 155d depends on data brought into the Tile by instruction 155c. The duration of instruction 155c is known, so the compiler knows that in the static schedule, instruction 155c must start at cycle c2 or earlier. This pattern is repeated for pairs of data transfer instructions and compute instructions 155e-f, 155g-h, 155i-j.

For Tile 2, compute instruction 155l depends on data from data transfer instruction 155k. However, instruction 155k does not start immediately at cycle c0. Rather, it has a delayed start at cycle c4. This may be because the data transfer path required by instruction 155k is occupied by some other data transfer instruction and is not available until cycle c4. The start time of instruction 155k in the static schedule is not determined by run-time arbitration or contention mechanisms for the shared data transfer path. Rather, the compiler knows that the data transfer path is occupied since the compiler knows the start times and durations of all the instructions, so the compiler simply creates a static schedule in which instruction 155k does not start until cycle c4 when the compiler knows the data transfer path will be available. Similarly, data transfer instruction 155m has a delayed start time. Perhaps the T2 D pipeline is being used to transfer out the results of computation 155l and does not become available until cycle c5.

For Tile 3, computation 155n starts immediately at cycle c0. Perhaps the required data was loaded into Tile 3 during some prior phase. Data transfer instructions 155o and 155p load data for compute instruction 155q. They are separated in time, perhaps because different pieces of data were not available or the data transfer paths were not available until those times. As a final example, data transfer instruction 155r loads data for compute instruction 155s. In the static schedule, the compiler places instruction 155r well in advance of when the data is required, but this may be because that is when the data transfer path is available or perhaps the data was transferred out of the sourcing Tile in order to make room in that Tile.

Execution of the instructions according to the static schedule at run-time may be implemented in different ways. In one approach, the computer program includes an express schedule for the execution of the instructions. Continuing the example of FIG. 1D, the computer program may specify that instruction 155a executes at cycle c0, instruction 155b at cycle c1, instruction 155c at cycle c2, etc. Alternatively, the compiler may fill each instruction stream with NO-OPs to achieve the correct timing. A NO-OP (no operation) is an instruction that occupies a certain number of cycles without other activity. For example, the compiler knows that instruction 155a will end at cycle c1 and instruction 155b is supposed to begin at cycle c1. It may fill the space between cycles c0 and c1 with NO-OPs for the T1 C pipeline. The T1 C pipeline then just continuously executes instructions from its queue, and the NO-OPs ensure that instruction 155b is executed according to the compiler's static schedule. In yet another approach, the static schedule may be implemented by hardware. The T1 C pipeline may just stall on the execution of instruction 155b until the data from instruction 155a is ready. The compiler knows that data will be ready at cycle c1 and, therefore, instruction 155b will execute starting at cycle c1 even though the Tiles are unaware of the static schedule. Regardless of the implementation, for convenience, all of these situations will be described using the phrase "static schedule." Thus, a statement that the compiler statically schedules the instructions is intended to include all of the above implementations and is not meant to imply that the computer program expressly includes a scheduled time for each instruction.

Figure 4:
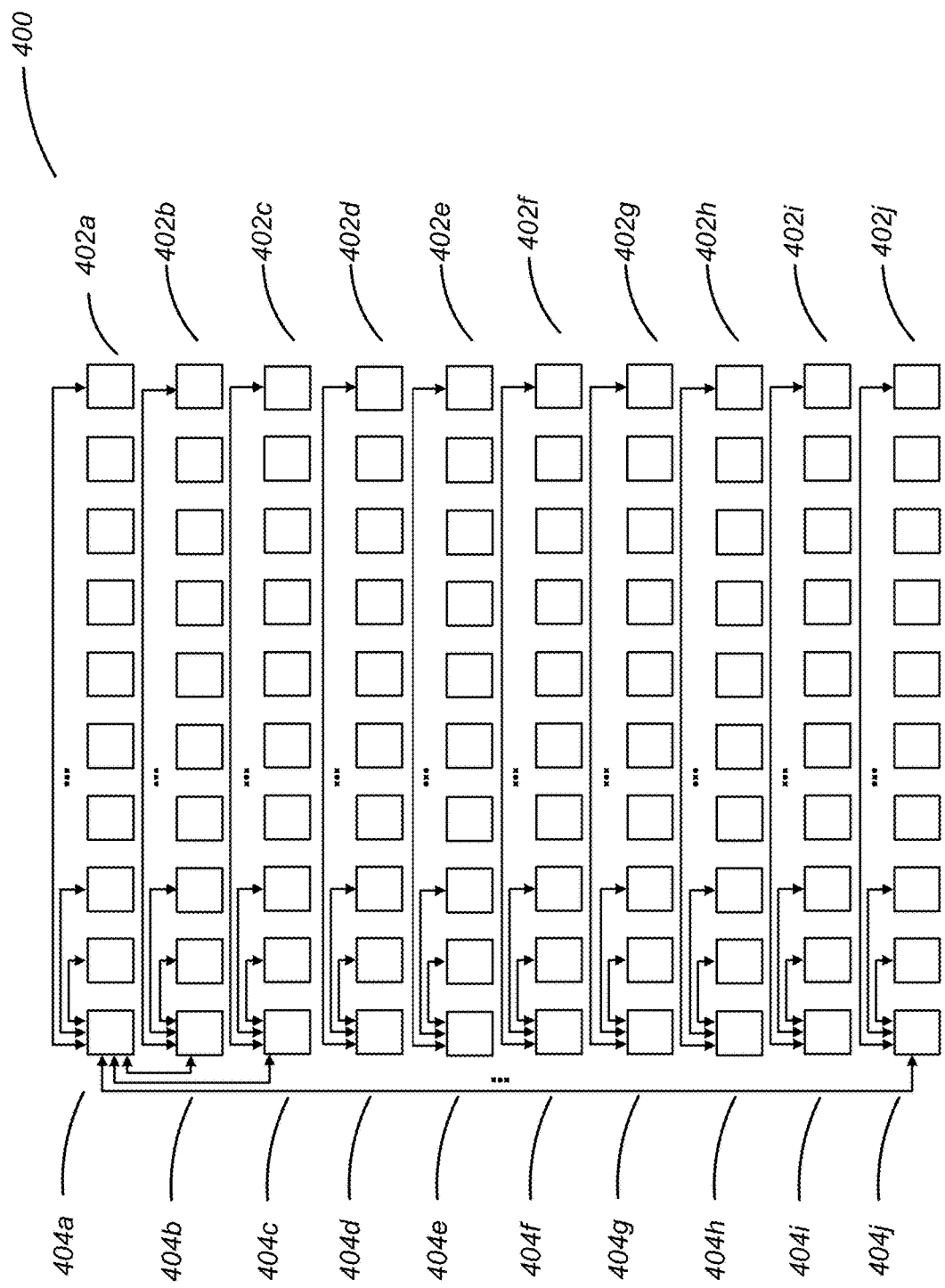
FIG. 4 illustrates a mesh of Tiles organized into rows and columns.
Figure 5:
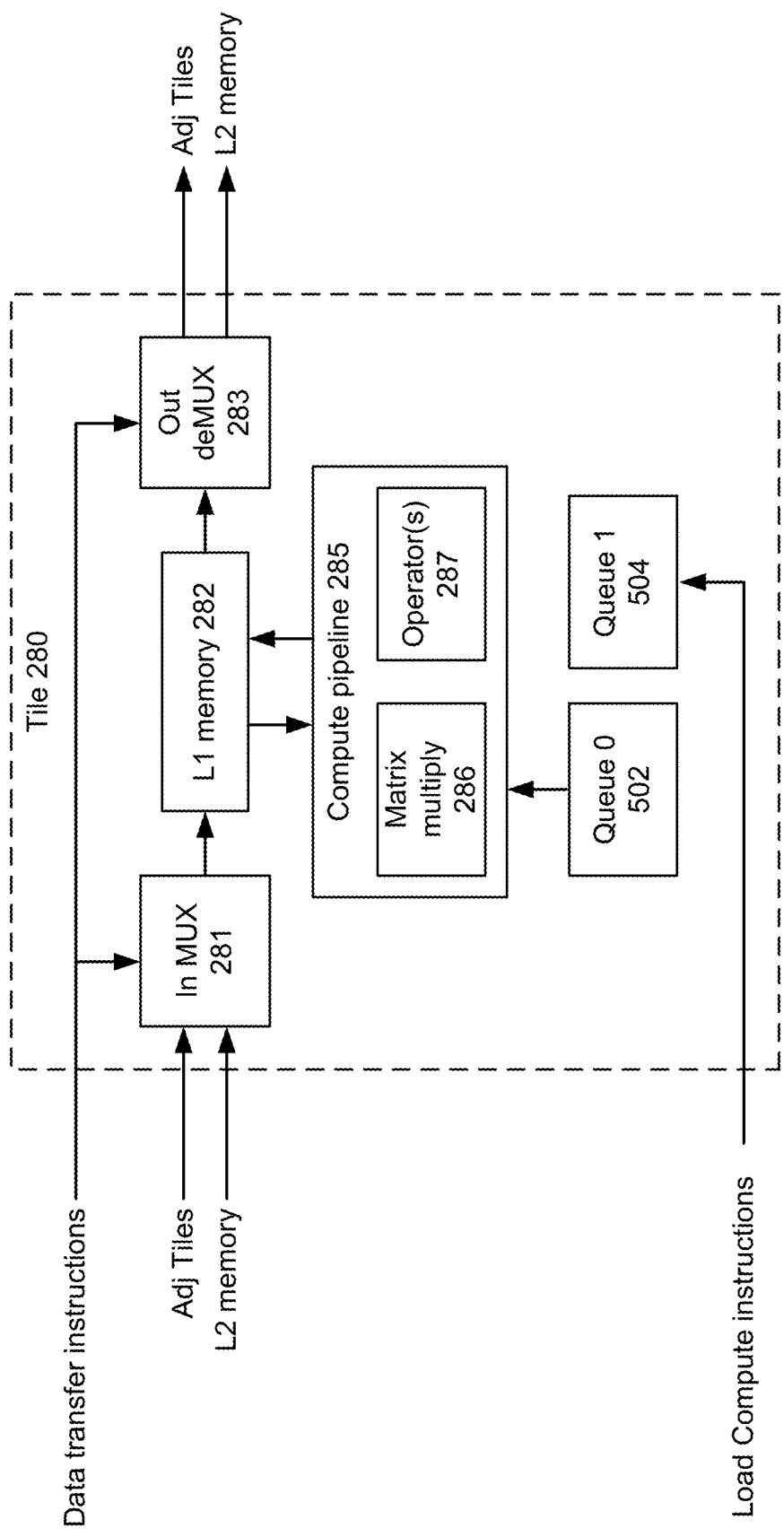
FIG. 5 illustrates a Tile having two instruction queues.

In order to statically schedule the instructions in a deterministic phase, the compiler typically will know the duration of each instruction (i.e., how long each instruction takes to execute), the capabilities of each Tile (which Tiles can execute which instructions), the topology of data transfer paths to and from Tiles (including between Tiles, and between Tiles and on-chip memory), and the computations required and their dependencies (i.e., the MLN description). With this information, the compiler can schedule unconditional start times for the Tile instructions. Here, unconditional refers to run-time conditions. The execution order of statically scheduled instructions will not change as a result of run-time conditions, branching or dependence on input values. As a result, compute instructions may be scheduled for start times when all of the required data for the computation is known to be available and the compute pipeline is also known to be available. The need for run-time determination of whether data has arrived and whether the compute pipeline is available may be avoided. Analogously, data transfer instructions may be scheduled for start times when the data transfer path is known to be available. The need for circuitry to handle arbitrations, or to check for or resolve contentions and collisions on shared data transfer paths at run-time may be avoided. The need for routing tables and other circuitry to determine routing at run-time may also be avoided. FIGS. 4 and 5 provide further examples of how the compiler converts a description of an MLN to a deterministic phase of statically scheduled instructions executed by the Tiles.

Other aspects include components, devices, systems, improvements, methods, processes, applications, computer readable mediums, and other technologies related to any of the above.

Since the deterministic phase is statically scheduled, the compiler knows when the deterministic phase will end. A next non-deterministic phase of instructions may start based on the known end time for the current deterministic phase. The phases may continue while the MLN is executed by the device hosting the MLA.

Figure 2A:
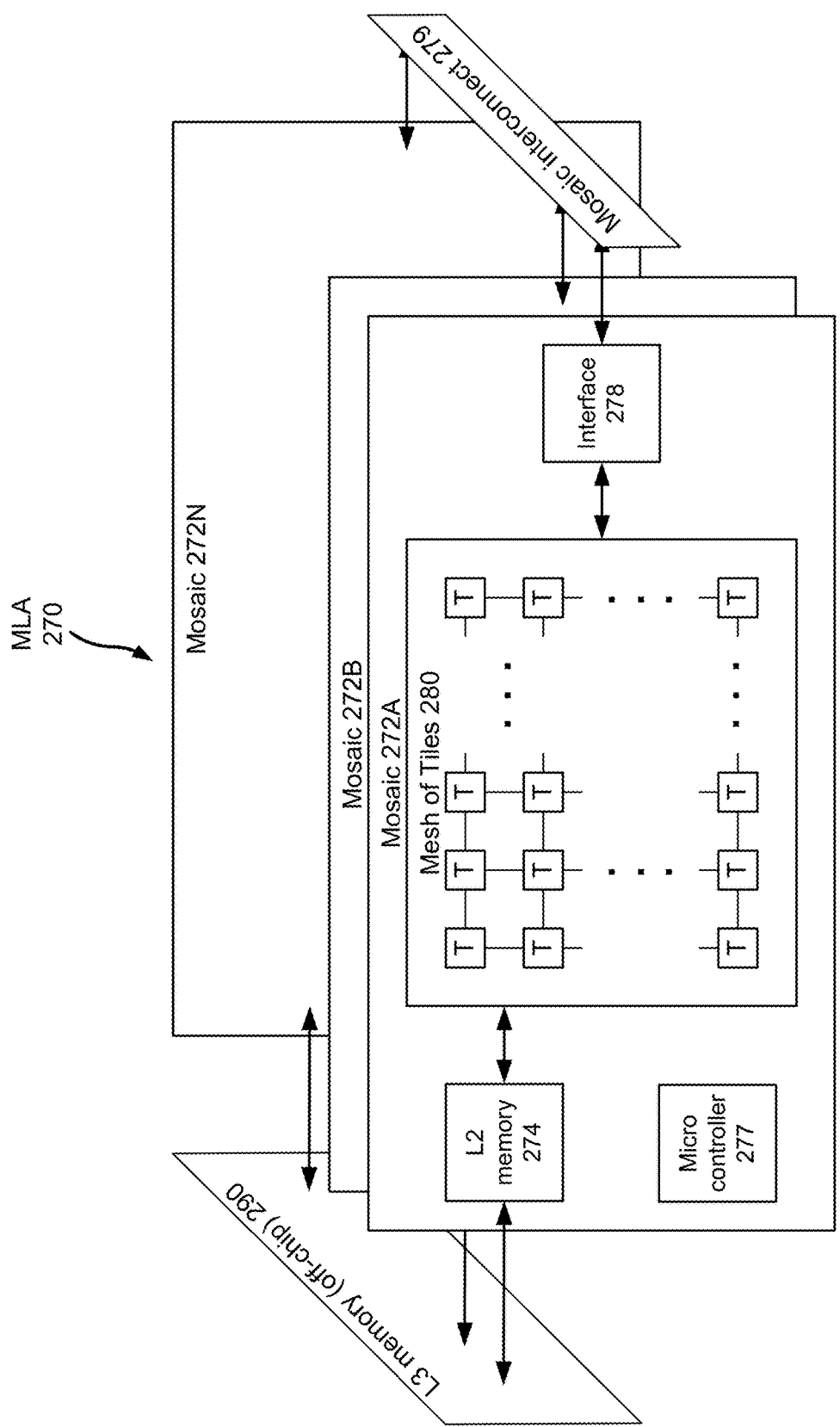
FIG. 2A is a block diagram of a hardware system including a Machine Learning Accelerator (MLA).
Figure 2B:
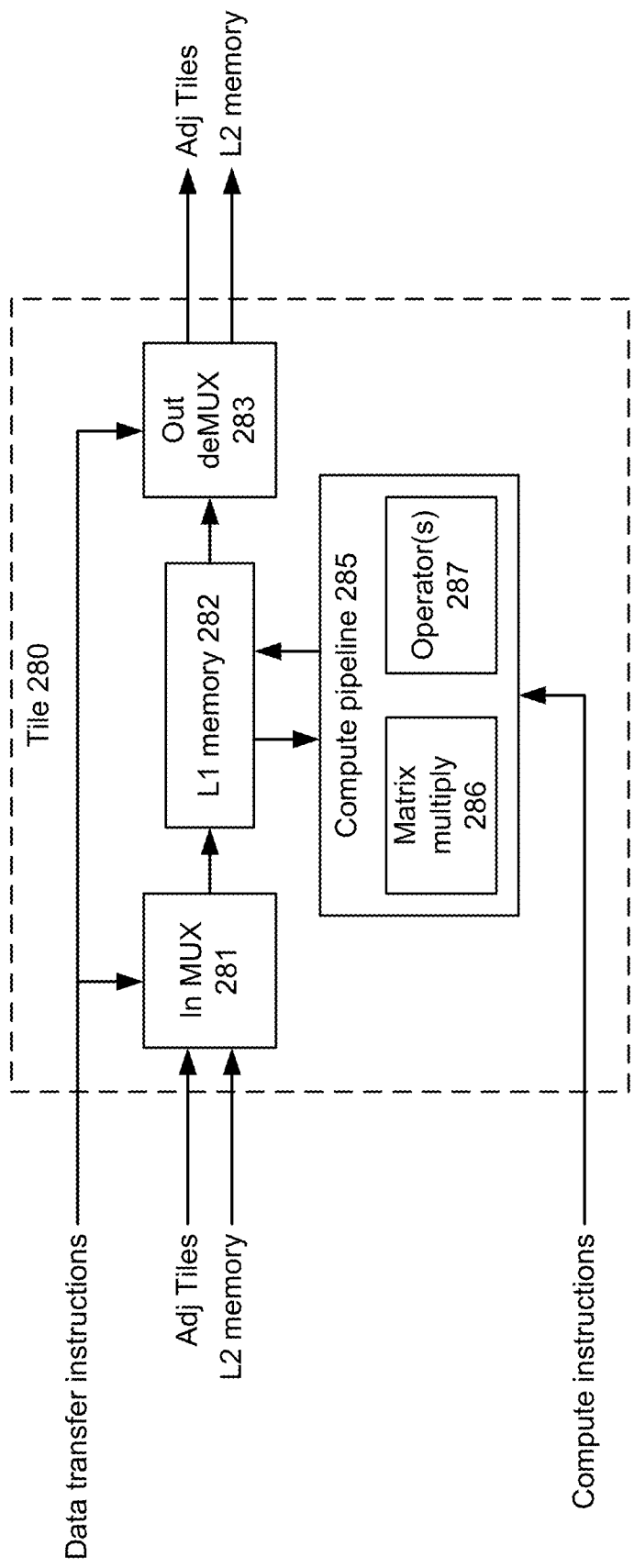
FIG. 2B is a block diagram of a Tile within the MLA.
Figure 3:
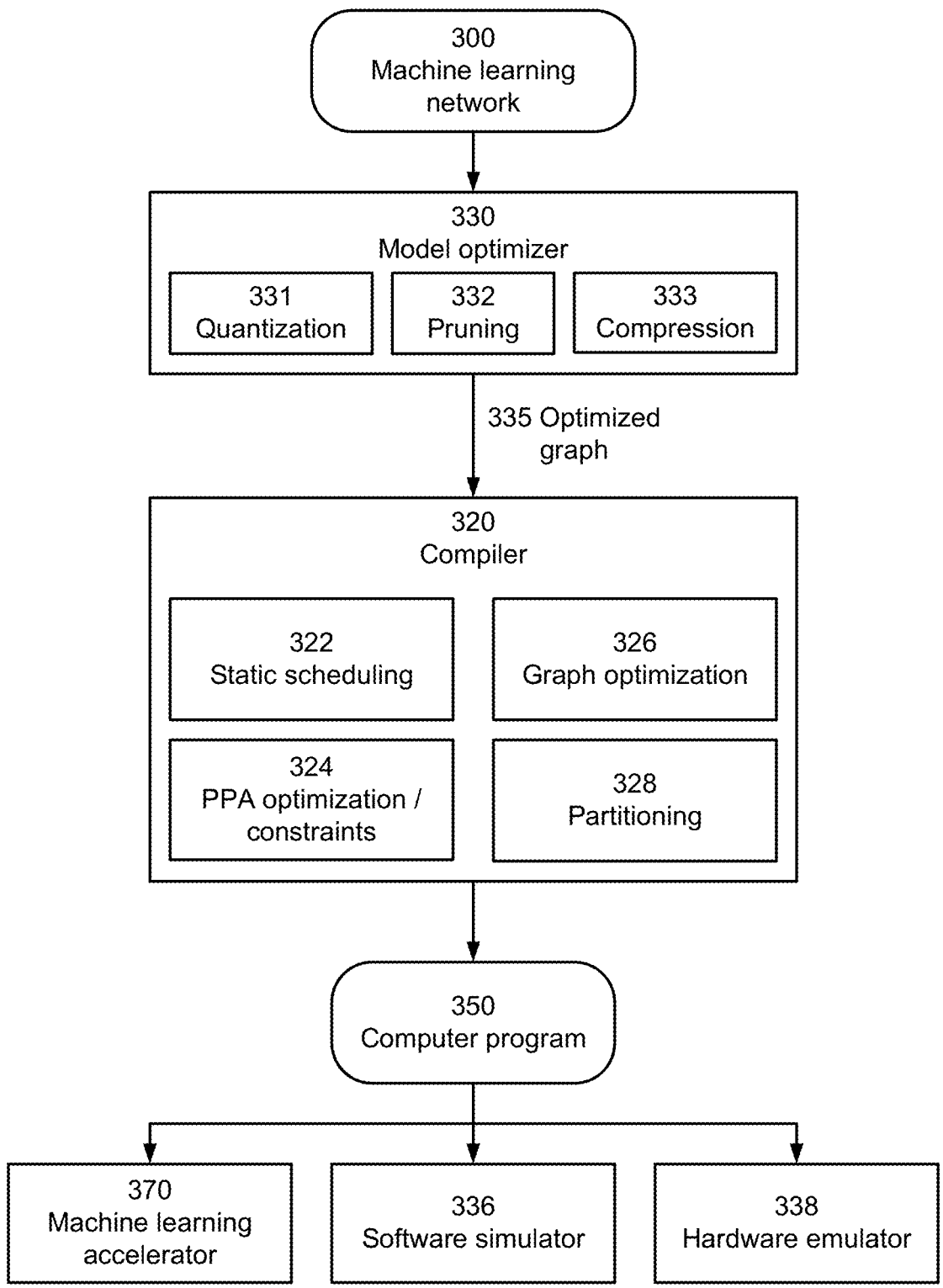
FIG. 3 is a block diagram of a software development environment including a machine learning (ML) compiler.

FIGS. 2-3 are more detailed descriptions of an example system that includes an MLA and corresponding compiler. FIG. 2 shows the hardware component and FIG. 3 shows the software development environment.

FIG. 2A is a block diagram of a hardware system including an MLA 270. The MLA 270 includes all the components shown in FIG. 2A, except the off-chip L3 memory 290. The MLA components are implemented on a single die as part of a single chip. The MLA 270 includes one or more mosaics 272A-N. In this example, all of the mosaics are the same. Each mosaic 272 includes a mesh of Tiles 280, an on-chip memory system and a controller 277. In FIG. 2A, the on-chip memory system is a multi-level memory system, which includes a level 1 (L1) memory distributed among the Tiles (see FIG. 2B) and a level 2 (L2) memory 274 shared by the Tiles. If there are multiple mosaics 272, the MLA 270 may include a dedicated interconnect 279 for connecting the different mosaics. Each mosaic also includes an interface 278 to the interconnect 279.

FIG. 2B is a block diagram of a Tile 280 within the MLA. In this example, all the Tiles are the same. Each Tile 280 includes an L1 memory 282. Each Tile 280 also includes a data transfer pipeline that executes instructions for transferring data to and from the L1 memory 282. Here, the Tiles 280 are arranged in a rectangular array as shown in FIG. 2A, with each Tile connected to its adjacent neighbors. Interior Tiles are connected to four adjacent Tiles. Edge Tiles are connected to adjacent Tiles and also to L2 memory 274. In FIG. 2B, the L1 memory 282 may receive data from any of its adjacent Tiles and/or from L2 memory if it is an edge Tile. Similarly, it may transfer data to any of its adjacent Tiles and/or to L2 memory if it is an edge Tile. The data transfer operations are controlled by data transfer instructions received and executed by the Tiles.

Each Tile 280 also includes a compute pipeline 285 for executing computations using data stored in the L1 memory 282. The L1 memory acts as software-configurable registers for the compute pipeline 285. The compute pipeline 285 includes matrix multiplication circuitry 286, such as a systolic array, and circuitry for implementing different types of operators 287. The computations are controlled by compute instructions received and executed by the Tiles.

In this particular example, all of the data transfer instructions and compute instructions executed by the Tiles are statically scheduled. These instructions include data transfer between L1 memories in different Tiles, and data transfer between L1 memory and L2 memory. Data transfer instructions may specify one hop at a time (e.g., transfer data to the east neighbor Tile) or may specify destination and path through intermediate Tiles (e.g., transfer data to Tile (5,5) using path east-east-north-north-east). The instructions also include matrix multiplies performed by the Tiles and operators applied by the Tiles. These operations do not require very many different instructions to implement, so the overall instruction set may be fairly small, for example not more than 20 instructions, or not more than 50 instructions.

The L3 memory 290 is off-chip. In this example, the L1 and L2 memories are implemented as on-chip SRAM and the L3 memory is implemented as DRAM (flash memory and SSD drives are other alternatives). Because the L1 and L2 memories are implemented as SRAM, the data transfers between L1 memories or between L1 and L2 memories have deterministic timing, so these data transfer instructions can be statically scheduled by the compiler. However, data transfer from off-chip DRAM is more unpredictable in timing. As a result, these instructions are non-deterministic in nature and they are executed by the microcontroller 277. Therefore, they are executed in one of the non-deterministic phases and they are not statically scheduled.

In one approach, the instructions in the computer program and the data required for computation (e.g., input, weights, biases, parameters for operators) are initially loaded into L3 memory 280. From time to time, instructions and associated data are transferred from L3 memory into L1/L2 memory during a non-deterministic phase since the timing of data transfers from DRAM is not deterministic. Once these instructions and data are loaded into L1/L2 memory, the computer program enters a corresponding deterministic phase in which the Tiles execute the loaded instructions according to a static schedule. The non-deterministic and deterministic phases may occur concurrently. For example, data may be continuously streamed into the L1/L2 memory during the non-deterministic phase, with the corresponding statically scheduled instructions from the deterministic phase consuming that data. In one approach, the Tiles execute only statically scheduled instructions, and all non-statically scheduled instructions are executed by processing elements outside the Tile mesh, for example the microcontroller 277. SRAM has predictable timing so implementing the L1 and L2 memories as SRAM allows the compiler to statically schedule data transfers from those memories into the Tiles for computation. However, there is a limit to the amount of SRAM that may be implemented on a die. In order to increase the effective size of SRAM, a virtual SRAM approach may be used. In one approach, the compute instructions that consume certain data are not fetched into the Tiles until after the corresponding data have been transferred from DRAM (L3 memory) to SRAM (L1/L2 memory). This guarantees that the compute instructions will not be executed by the Tiles before the data is available. All data effectively will appear as if it is transferred to the Tiles from SRAM for computation, even if all of the data would not fit into the available SRAM.

L2 memory may also be used to temporarily store interim values that are too voluminous to store in L1 memory. For example, a layer K of the MLN may produce a large amount of data at its output, to be used as input to the next layer K+1. The layer K output may be stored in L2 memory and then retrieved from L2 memory as needed for the next layer's computations. This may be implemented using a ping pong buffer approach when multiple input samples are processed as a pipeline. The L2 memory is divided into two regions A and B. When a first input sample is processed, the layer K output is stored in region A of the L2 memory. The computations for layer K+1 retrieve the stored values from region A. At the same time, the second input sample is processed and the layer K output is stored in region B of the L2 memory. The two regions then alternate, with the Tiles implementing layer K storing to one region while the Tiles implementing layer K+1 read from the other region. The synchronization is implemented by the static scheduling. The compiler knows when regions AB will be ready and the instructions to implement layer K+1 will execute after that time. No synchronization primitives are needed.

FIG. 3 is a block diagram of a software development environment including an ML compiler 320. In this example, the software development environment also includes a model optimizer 330. The model optimizer 330 receives a description of the MLN 300 and produces an optimized graph 335 of the MLN. It may apply optimizations such as quantization 331, pruning 332 and/or compression 333. Quantization 331 reduces the resolution of calculated values. For example, floating point values may be quantized to a certain number of bits and then integer math used instead of floating point math. This reduces the complexity and power consumed by the Tiles. Pruning 332 removes parts of the MLN that do not contribute significantly to the overall results. For example, if certain weights are zero or close to zero, those weighted interconnects may be pruned. Finally, because MLNs contain a large amount of data, compression may be used successfully to reduce data transfer bandwidths.

The resulting optimized description 335 of the MLN may be expressed as a graph, in which the nodes of the graph represent nodes in the MLN and the edges of the graph represent the weighted interconnects. The compiler 320 receives the optimized graph 335 and produces the resulting computer program 350. The compiler 320 may perform operations including static scheduling 322, PPA (power performance area) optimizations 324, graph optimizations 326 and/or partitioning 328. Static scheduling 322 of the appropriate instructions was described above. PPA optimization 324 includes different optimizations of the computer program 350. For example, the allocation of MLN computations to Tiles may be optimized to reduce power consumption, to increase performance (such as reducing latency or increasing throughput) and/or to reduce area (e.g., number of Tiles used). Examples of this are described in FIG. 4.

For a given graph representation of an MLN, the number of computations required to execute the MLN is fixed. As a result, in one approach, the compiler may optimize to increase the utilization of compute resources in the Tiles—to keep the compute pipelines as busy as possible. However, for a Tile to execute a computation, the data for that computation must be available. This means that any prior computations must be completed and that those results must be transferred to the Tile doing the next computation. Thus, rather than focusing on computations, the compiler may optimize with respect to data transfer to reduce the wait times of computations. It may also allocate computations to Tiles in order to reduce data transfers between Tiles in the same mesh, to reduce data transfers from outside the MLA and/or to reduce data transfers that cross the boundary of the mesh (e.g., reducing data transfers between L1 and L2 memory and trying to keep all data in L1 memory).

The compiler 320 may also optimize 324 the computer program 350, subject to constraints on power, performance, area and/or any of the quantities described above. Graph optimization 326 includes analysis of the graph representing the MLN to prune, merge or quantize links, parameters, values, and layers to achieve better performance. Partitioning 328 concerns mapping the computations in the MLN to an implementation on the MLA. This includes determining which computations are allocated to which Tiles and how data flows through the mesh of Tiles during computation. If there are multiple mosaics, it also includes determining which computations are allocated to which mosaics.

The resulting computer program 350 may be loaded into memory for execution on a machine learning accelerator 370. For example, one possible application is object detection. In this case, the inputs are images captured by a video camera. The MLN 300 has been trained to identify certain objects in the video images. The computer program 350 implementing the MLN is loaded onto memory that is accessible by the MLA 370, which is implemented as a chip inside the camera. This way, images captured by the video camera may be immediately analyzed by the computer program 350 running on the MLA 370.

In addition to the MLA 370, the computer program 350 or parts of it may be run on a software simulator 336 and/or hardware emulator 338 (including FPGAs configured as MLAs). These may be used for product development, debugging and/or prototyping. For some purposes, a full simulation or emulation is not necessary. For example, to check that there are no collisions or conflicts between statically scheduled instructions, only the flow of data may be simulated or emulated. It is not necessary to compute actual values.

Referring to the synchronization process during the non-deterministic phase, FIG. 4 illustrates a mesh of Tiles organized into rows and columns. FIG. 4 shows rows 402a-402j each including ten Tiles with a total of ten rows of Tiles. Each row may include a Tile 404 that has been selected as a designated tile. Thus, the mesh of Tiles in FIG. 4 includes ten designated tiles (Tiles 404a-404j). Moreover, Tile 404a may be designated as a Master Tile. As shown in FIG. 4, each Tile in a row may include an interconnect to a corresponding designated Tile 404. Thus, when all statically scheduled instructions have been transferred to each Tile, each Tile may transmit a ready signal (e.g., ready signal discussed in relation to FIG. 1C) to a corresponding Tile 404. The Tiles that are not participating in the next deterministic may also transmit a ready signal so that each of the designated Tiles and the master Tile know when to transmit the start signal. Except the Tiles that are not participating in the next deterministic phase will not start execution based on the start signal. Each Tile 404 may transmit the ready signal to Tile 404a which may have been designated as the master Tile (e.g., as a Master Tile shown in FIG. 1C). Thus, each processing element determines that execution of the non-deterministic phase has completed with respect to that processing element and generates a ready signal upon such determination. As a result, synchronizing the processing elements includes generating a synchronization signal (i.e., a ready signal) for the processing elements, once all processing elements have generated the ready signal.

When Tile 404a receives all the expected ready signals, Tile 404a sends an acknowledgment signal to each other Tile 404 (b-j). Each Tile 404 transmits the acknowledgment signal to each Tile in a corresponding row. That is, one of the processing elements determines that all processing elements have generated corresponding ready signals and generates and transmits the synchronization signal to all the other processing elements.

When each Tile receives the acknowledgment signal, the Tile begins execution of the deterministic phase. When a Tile begins execution of the deterministic phase of instructions, the Tile pulls instructions from a queue where the instructions have been written during the non-deterministic phase. When instructions are executed from the queue, other instructions cannot be written to the queue because this would break the deterministic phase of execution. Thus, it may be advantageous to have a mechanism that enables transferring instructions for executing a next deterministic phase while current instructions are being executed. Thus, the processing elements (e.g., the Tiles) are part of a mesh of processing elements and actions for determining that the non-deterministic phase has completed and actions synchronizing the processing elements are performed by circuitry within the mesh.

FIG. 5 illustrates a Tile with two instruction queues for the compute pipeline 285. The components of FIG. 5 may be the same as components of FIG. 2B, except the Tile of FIG. 5 now illustrates a queue 502 and a queue 504. While the Tile may be executing statically scheduled instructions in queue 502, the next set of statically scheduled instructions for the next deterministic phase may be loaded into queue 504. When all the statically scheduled instructions have been executed from queue 502, the Tile may switch (e.g., using an active queue pointer) to queue 504. The Tile may determine whether all the instructions have been loaded into queue 504 before sending a ready signal. In other words, subsequently to execution of a last instruction in a first instruction queue of a processing element (e.g., a Tile), the processing element may determine that it has finished transferring the instructions into a second instruction queue, and transmitting a synchronization signal that indicates that the processing element is ready for executing the instructions in the second instruction queue.

In some embodiments, a processing element (e.g., a Tile) may concurrently (a) execute the deterministic phase of instructions from one of the instruction queues; and (b) execute a subsequent non-deterministic phase of fetching instructions into the other instruction queue for execution in a subsequent deterministic phase.

Figure 6:
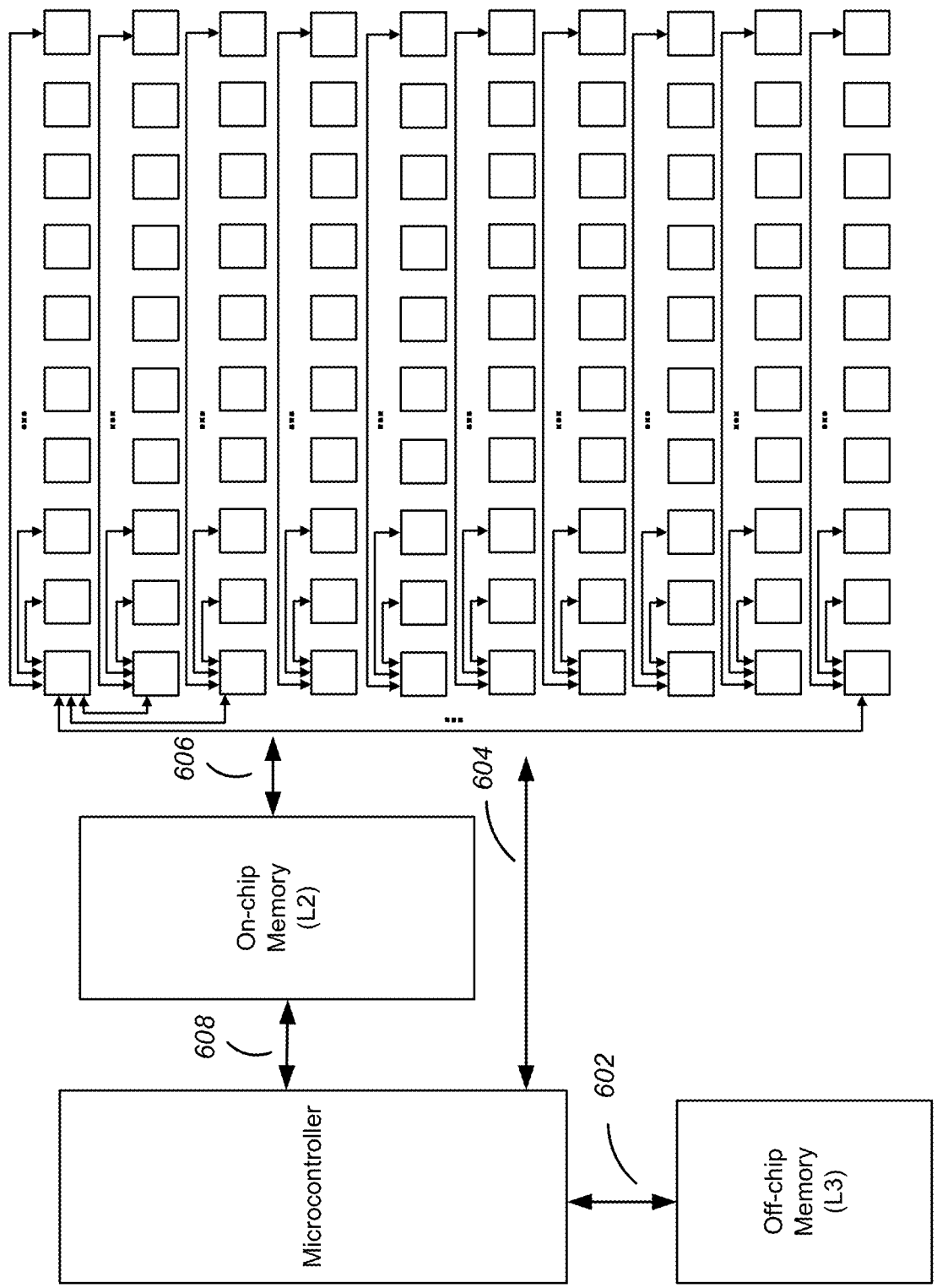
FIG. 6 illustrates an alternative process for synchronizing Tiles for execution of a deterministic phase.

In some embodiments, the synchronization process may be performed in a different manner. FIG. 6 illustrates an alternative process for synchronizing Tiles for execution of a deterministic phase. In the embodiments of FIG. 6, the microcontroller that is external to the processing elements, determines at least in part, that the non-deterministic phase has completed. A microcontroller may, as illustrated by arrows 602 and 608, transfer data and statically scheduled instructions (e.g., using the DMA) from the off-chip memory (e.g., L3 memory described in relation to FIGS. 2A and 2B) to the on-chip memory (e.g., L2 memory described in relation to FIGS. 2A and 2B). Arrows 606 and 608 are bi-directional, at least, because the microcontroller may transfer processed or intermediate result data to the off-chip memory. The microcontroller may have other bidirectional communication with off-chip memory and the on-chip memory. When the data and statically scheduled instructions are transferred into L2 memory, the microcontroller may, as indicated by arrow 604, send a signal to each Tile that is participating in a given deterministic phase a ready signal indicating that the data and statically scheduled instructions are ready for the deterministic phase.

When each Tile receives the ready signal, the Tile may, as indicated by arrow 606, access a location within the L2 memory that includes the statically scheduled instructions. The Tile may begin executing the statically scheduled instructions from within the L2 memory by, for example, transferring each instruction into a predetermined location in the L1 memory (e.g., L2 memory described in relation to FIGS. 2A and 2B). The Tile may also transfer the data for executing the instruction from L2 memory into L1 memory and begin executing the instruction. One or more Tiles may also transfer result data and/or intermediate data to L2 memory as illustrated by arrow 606 being bi-directional. In some embodiments, the Tile may transfer a number of instructions (e.g., thirty-two instructions) from the L2 memory into a queue within the Tile and execute those instructions. Thus, the microcontroller may synchronize execution of each deterministic phase.

Figure 7A:
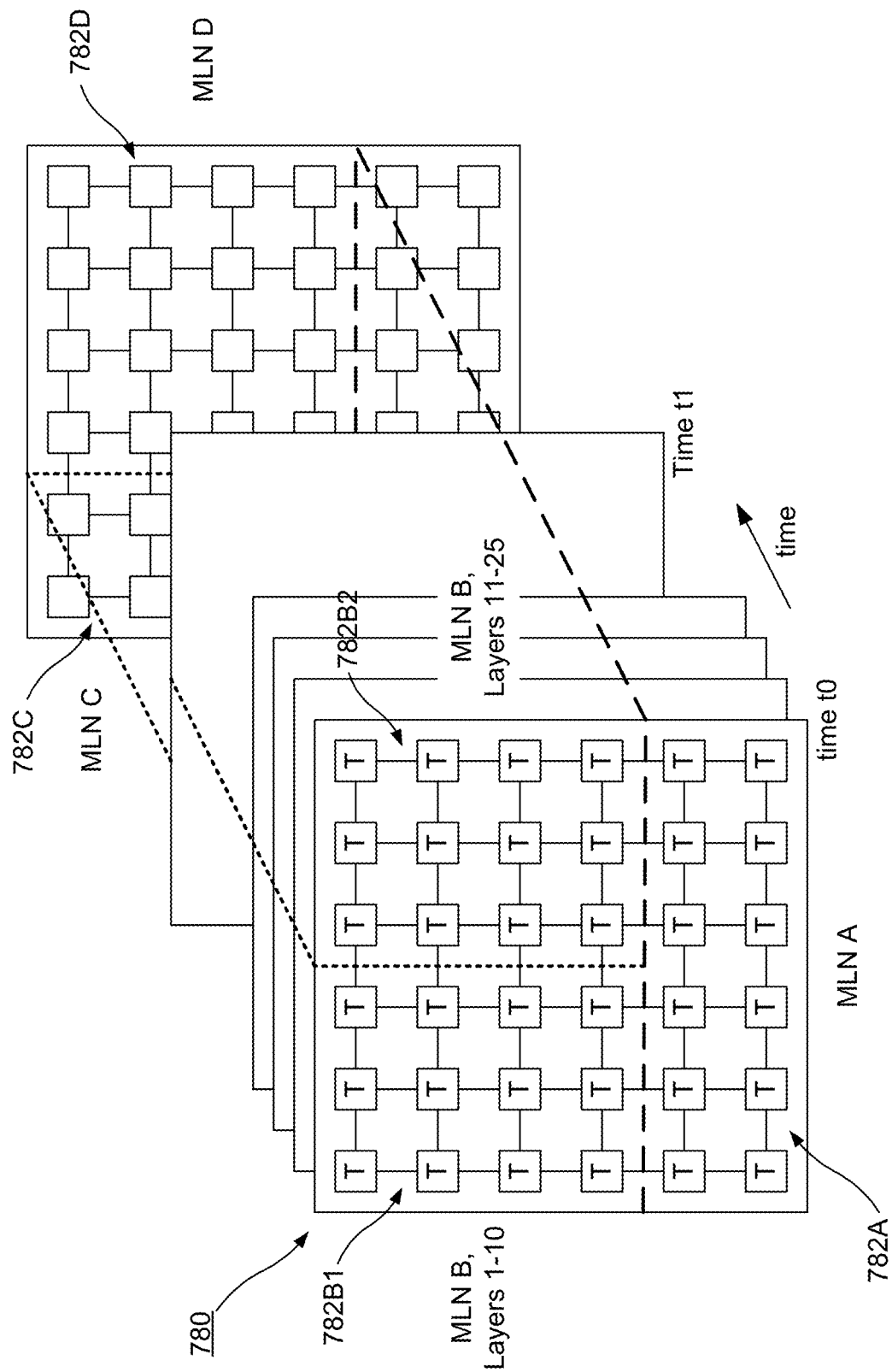
FIG. 7A includes an MLA with a 6×6 mesh of Tiles.
Figure 7B:
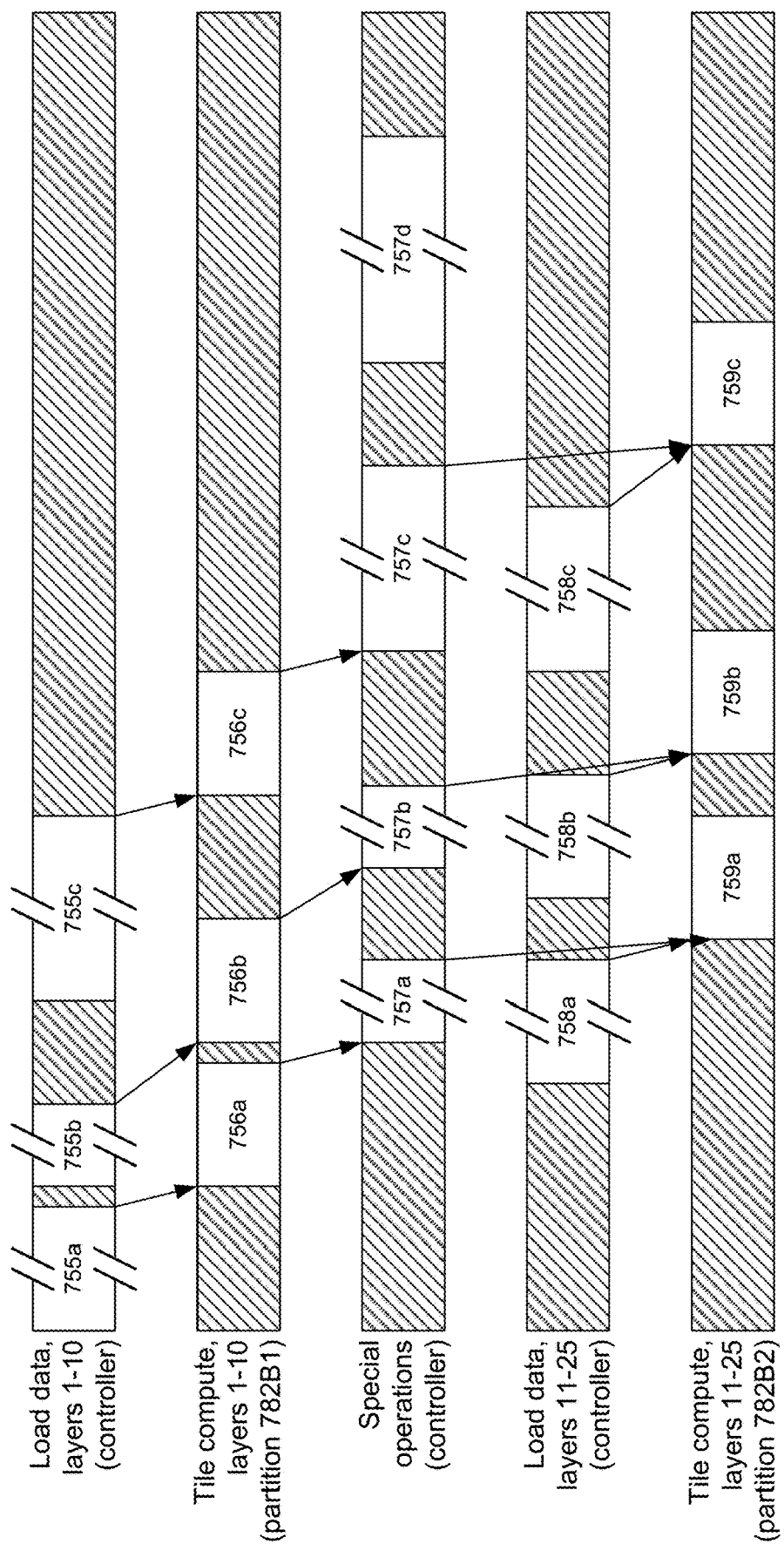
FIG. 7B illustrates deterministic and non-deterministic phases for partitions.

The embodiments described above may be used to execute a single MLN. However, the MLA is enabled to execute multiple MLNs. FIGS. 7A and 7B illustrate partitioning the mesh of Tiles to different subnets of an MLN and to different MLNs. In FIG. 7A, the MLA includes a 6×6 mesh (element 780 in FIG. 5A). From time t0 to t1, the mesh 780 is utilized to implement two different MLNs: MLN A and MLN B. The Tiles are divided into three partitions 782A, 782B1, and 782B2. Partition 782A implements MLN A, partition 782B1 implements the first 10 layers of MLN B, and partition 782B2 implements the remaining 15 layers of MLN B. MLN B may be partitioned in this manner because some off-Tile operations may be required between layers 10 and 11. Maybe the output of layer 10 requires a computation that is performed off-Tile in a non-deterministic manner, or maybe layers 11-25 require data that cannot be loaded in a manner consistent with the static scheduling of layers 1-10. After time t1, the mesh 780 continues to implement MLN B using partition 582A, but MLN A is replaced by MLNs C and D using partitions 782C and 782D, respectively.

FIG. 7A shows a progression over time. The front diagram shows the partitioning at an earlier time and the subsequent diagrams show the partitioning at later times. The times are indicated to the lower right of the diagrams. At time t0, the mesh is partitioned so that the bottom 2×6 Tiles implement MLN A, the upper left 4×3 Tiles implement MLN B layers 1-10, and the upper right 4×3 Tiles implement MLN B layers 11-25. At time t1, MLN B is no longer required and is replaced by MLNs C and D. 11-25. The upper left 4×2 Tiles now implement MLN C, and the upper right 4×4 Tiles now implement MLN D.

Note that each of these partitions may run deterministic and non-deterministic phases separately from each other. Partition 782A implements MLN A, which is independent of MLN B implemented by partitions 782B1 and 782B2. Thus, partition 782A may run separately from the other two partitions. At time t1, partition 782A may continue to run, unaffected by the change from MLN B to MLNs C and D.

FIG. 7B illustrates deterministic and non-deterministic phases for partitions 782B1 and 782B2. Each row represents different phases of instructions. The white regions of each row denote the execution of instructions and the hashed regions indicate idling. Non-deterministic phases are indicated by breaks in the rectangles. From top to bottom, the rows are the following. The top row has instructions to load data for the computations of layers 1-10 from DRAM into the MLA. This data will be consumed by Tile partition 782B1. Referring to FIG. 2A, this is performed by the controller 277 and these phases 755 are non-deterministic because they are loads from DRAM. The second row has the deterministic phases 756 of statically scheduled Tile instructions that implement the computations for layers 1-10. Similarly, the fourth row has non-deterministic phases 758 for loading data for the computation of layers 11-25, and the bottom row has deterministic phases 759 of statically scheduled Tile instructions that implement these computations, respectively. The middle row has other non-deterministic instructions 757. In this example, this includes non-deterministic computations 757*a-c* that occur outside the MLA, and instructions 757*d* to repartition the MLA.

The suffixes indicate different input samples. The phases that end in -a apply the MLN to one input sample, the phases that end in -b apply the MLN to the next input sample, etc. The arrows indicate dependencies. Consider first input sample a. A controller loads 755*a* the relevant data (input values, weights, biases, operator parameters) from DRAM into the MLA memory. After this is completed, the Tiles 782B1 may perform their computations 756*a* using this data. The Tile output is transferred off-chip for a computation 757*a* that is not performed by the Tiles. In the meantime, the controller loads 558*a* the relevant data for layers 11-25. When data from both non-deterministic phases 757*a* and 758*a* are available, Tile partition 782B2 performs its computations 759*a*. The Tile computations within each phase 756*a* and 759*a* are statically scheduled within their respective non-deterministic phases, but the time between phases 756*a* and 759*a* may vary. The processing of input samples b and c have the same dependencies and general flow.

At some point (time t1 in FIG. 7A), the controller ends execution of MLN B and starts execution of MLNs C and D. The compiler has provided different schedules with different partitions of the Tiles as partition 782C for MLN C and partitions 782D for MLN D. This is phase 757*d*. The process then continues with each of the active partitions 782A, C, D execution instructions to implement their respective MLNs.

Figure 8:
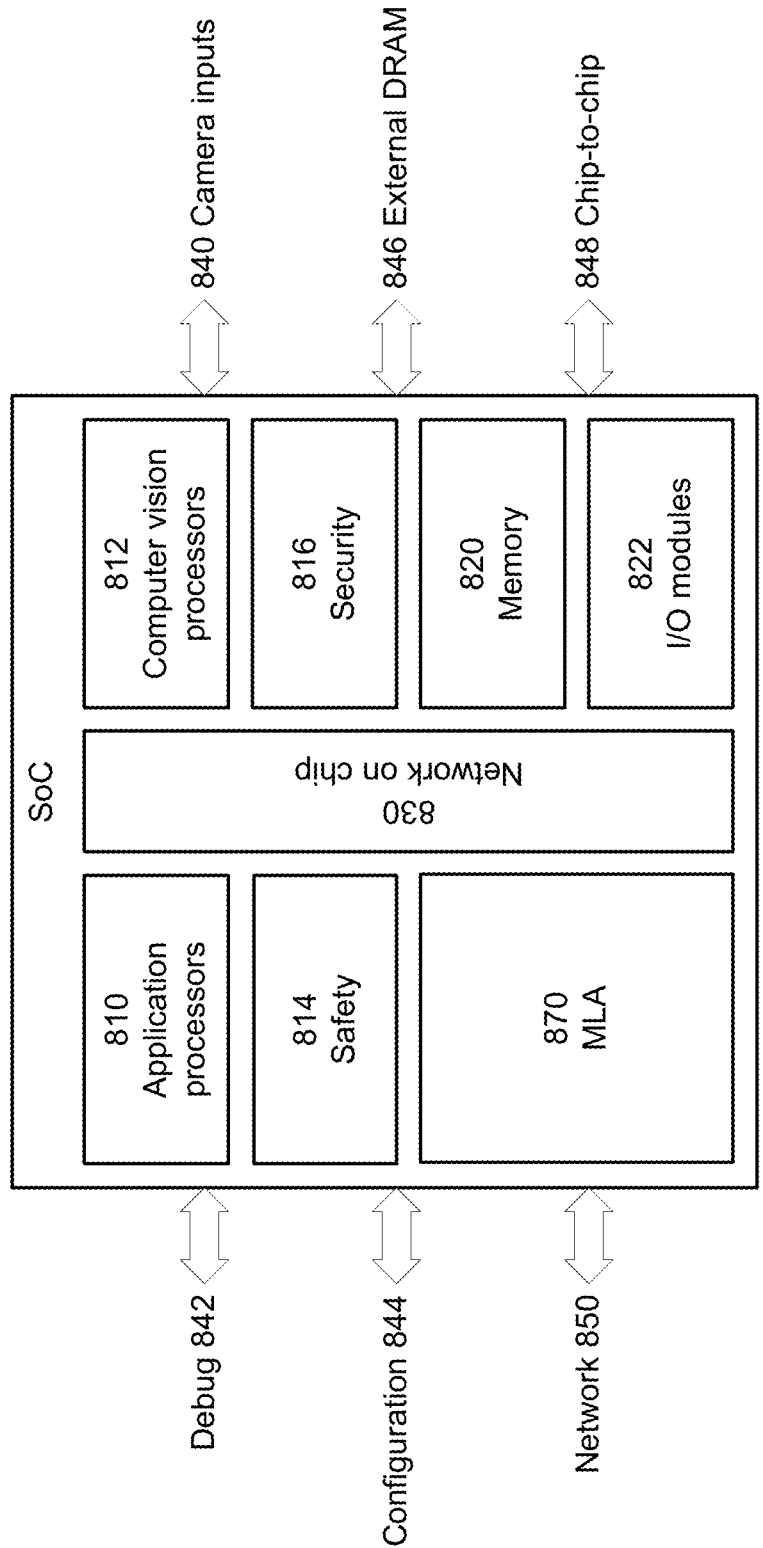
FIG. 8 is a block diagram of an integrated circuit that includes an MLA.

The approach based on static scheduling described above is not restricted to the examples described above. For example, different network topologies of Tiles may be used. FIGS. 6-8 illustrate some other examples of different Tile meshes which may also be statically scheduled, so long as the time required to execute computations and to transfer data between Tiles is deterministic and may be determined at compile time.

In the previous example of FIG. 2, the Tiles in the mesh all had the same capability. Each Tile had a compute pipeline that could perform matrix multiplication and implement certain operators. Each Tile also had a data transfer pipeline to transfer data to and from its local L1 memory.

As discussed above, the MLA includes various components that are on the same die. The MLA may be integrated into a larger integrated circuit product (e.g., as part of an edge device). FIG. 8 is a block diagram of an integrated circuit that includes an MLA 870. In other words, other components may be included on the same die as the MLA. This example includes the following additional blocks: application processor 810 (e.g., general purpose CPU running applications), computer vision processor 812 (or other types of application-specific processors), safety 814, security 816, additional SRAM (memory) 820 and input/output circuitry 822. It also includes a network 830 for communication between the different components. This type of semiconductor chip may be referred to as a system-on-chip (SoC).

The connections to the external world include camera inputs 840 for the computer vision processors, ports for debug 842 and configuration 844, a connection 846 to external memory (e.g., DRAM), chip-to-chip connections 848, and network connections 850 (e.g., Ethernet and PCIe).

The SoC of FIG. 8 may be combined with other components to perform various tasks in edge devices. Example applications for edge devices include automotive and other forms of transportation including autonomous transportation, agricultural, industrial, robotics, drones, surveillance and security, smart environments including smart cities, medical and personalized health. Example tasks include computer vision, image analysis, image understanding, speech recognition, audio analysis, audio understanding, natural language processing, classification and pattern recognition tasks. For edge devices, it may be desirable to perform certain tasks in real-time.

In addition to memory and other programmable processors, an edge device may also include sensors, such as cameras (both still image and video cameras), microphones, temperature sensors, pressure sensors and other types of sensors. The sensors may capture samples that are used as inputs to a computing pipeline within the edge device. For example, image samples may be input to the computer vision processors 812, which perform initial operations such as edge detection and enhancement, contrast enhancement, motion detection, and optical flow. Raw and/or processed images may be then input to the MLA 870 for analysis by the machine learning network. The MLA may also receive other inputs, such as metadata from other sources and data from other sensors. The application processors 810 may also perform various functions in the overall pipeline and may also serve as a master controller that coordinates operation of the MLA and the other programmable processors in the pipeline.

Edge devices may be portable with less power available for computations compared to, for example, cloud-based server farms. It may also be desirable for the computing pipeline within the edge device to perform tasks without utilizing cloud-based or other remote compute resources. In some implementations, the MLA implements computations in the machine learning network at a speed of at least 50 TOPs (50 trillion operations per second) at a power consumption of not more than 5 watts. The speed may be increased by increasing the number of Tiles in the mesh or the number of Tile meshes on the die.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A method for implementing a machine learning network (MLN) by executing a computer program of instructions on a machine learning accelerator (MLA) comprising a plurality of interconnected processing elements, the instructions partitioned into one or more non-deterministic phases and one or more deterministic phases, the method comprising:

executing a non-deterministic phase of the instructions;
determining that execution of the non-deterministic phase has completed;
subject to the determination that the execution of the non-deterministic phase has completed, executing a deterministic phase of the instructions; wherein:
  execution of the deterministic phase is dependent on completion of the non-deterministic phase,
  the instructions in the deterministic phase include both instructions for processing elements to perform computations (compute instructions) and instructions to transfer data between the processing elements (data transfer instructions),
  the compute and data transfer instructions in the deterministic phase are executed concurrently by the processing elements according to a static schedule relative to the other compute and data transfer instructions in the deterministic phase with unconditional start times for every compute and data transfer instruction within the deterministic phase, and
  the static schedule for the concurrent execution of the compute and data transfer instructions in the deterministic phase is determined by a compiler before run-time and does not depend on run-time conditions, branching or values of inputs to the instructions; and
prior to executing the deterministic phase, synchronizing the plurality of processing elements upon completion of the non-deterministic phase for execution of the statically scheduled instructions.

2. The method of claim 1, wherein:
the non-deterministic phase comprises (a) transferring data to be used in the deterministic phase, to memory accessible by the processing elements during the deterministic phase, and (b) transferring instructions to be executed by the processing elements during the deterministic phase, to instruction queues for the processing elements; and
execution of the deterministic phase is dependent on completion of (a) and (b) above.

3. The method of claim 2, wherein the data to be used in the deterministic phase comprises parameters for the machine learning network.

4. The method of claim 2, wherein the data to be used comprises intermediate values for the machine learning network computed during prior deterministic phases.

5. The method of claim 2, wherein step (a) of transferring data occurs before step (b) of transferring instructions that use the data.

6. The method of claim 1, wherein determining that the non-deterministic phase has completed comprises:
determining that data to be used in the deterministic phase has been transferred to memory accessible by the processing elements during the deterministic phase.

7. The method of claim 1, wherein determining that the non-deterministic phase has completed comprises:
determining that the instructions to be executed by the processing elements during the deterministic phase have been transferred to instruction queues for the processing elements.

8. The method of claim 7, wherein determining that the instructions to be executed by the processing elements during the deterministic phase have been transferred to instruction queues for the processing elements comprises:
each processing element determining whether its instructions have been transferred to its instruction queue.

9. The method of claim 1, wherein the non-deterministic phase comprises:
a controller executing instructions to transfer data to be used in the deterministic phase, to memory accessible by the processing elements during the deterministic phase, wherein the controller is external to the processing elements;
the controller determining, for each processing element, when the data for that processing element has been transferred to memory accessible by that processing element; and
upon said determination, the controller issuing a command to that processing element to fetch instructions to be executed by that processing element.

10. The method of claim 9, wherein:
the non-deterministic phase further comprises each processing element determining whether its instructions have been transferred to its instruction queue; and each processing element generating a ready signal that its instructions have been transferred to its instruction queue; and
determining that execution of the non-deterministic phase has completed comprises determining that all processing elements have generated ready signals.

11. The method of claim 10, wherein the processing elements are part of a mesh of processing elements, and determining that all processing elements have generated ready signals is performed at least in part by circuitry within the mesh.

12. The method of claim 1, wherein determining that the non-deterministic phase has completed is performed at least in part by a controller external to the processing elements.

13. The method of claim 1, wherein the processing elements are part of a mesh of processing elements, and determining that the non-deterministic phase has completed and synchronizing the processing elements are performed by circuitry within the mesh.

14. The method of claim 1, wherein:
each processing element determines that execution of the non-deterministic phase has completed with respect to that processing element and generates a ready signal upon such determination; and
synchronizing the processing elements comprises generating a synchronization signal for the processing elements, once all processing elements have generated the ready signal.

15. The method of claim 14, wherein one of the processing elements determines that all processing elements have generated the ready signal, and generates and transmits the synchronization signal to all of the other processing elements.

16. The method of claim 1, wherein executing the deterministic phase of statically scheduled instructions has a known duration, the method further comprising:
starting execution of a subsequent non-deterministic phase of the instructions, based on the known duration of the deterministic phase.

17. The method of claim 1, wherein the processing elements have pairs of instruction queues, the method further comprising:
concurrently (a) executing the deterministic phase of instructions from one of the instruction queues; and (b) executing a subsequent non-deterministic phase of fetching instructions into the other instruction queue for execution in a subsequent deterministic phase.

18. The method of claim 1, wherein the processing elements have pairs of instruction queues, the method further comprising:
subsequently to execution of a last instruction in a first instruction queue of a processing element, determining that the processing element has finished transferring the instructions into a second instruction queue; and
transmitting a synchronization signal that indicates that the processing element is ready for executing the instructions in the second instruction queue.

19. The method of claim 1, wherein:
executing each of the statically scheduled instructions in the deterministic phase has a known duration; and
the static schedule for executing the instructions in the deterministic phase is based on the known duration for executing each instruction and on a known topology of data transfer paths to and from the processing elements, wherein execution of the instructions according to the static schedule avoids arbitrations and collisions along the data transfer paths.

20. The method of claim 1, wherein:
the MLA comprises a local memory implemented on a same semiconductor die as the processing elements;
the deterministic phase comprises instructions executed by the processing elements to transfer data to and from the local memory; and
the non-deterministic phase comprises instructions to transfer data to the local memory from locations not accessible by the processing elements during the deterministic phase.

21. The method of claim 1, wherein the processing elements execute instructions during the deterministic phase to perform matrix multiplication.

* * * * *